United States Patent
Kim et al.

(10) Patent No.: US 10,473,492 B2
(45) Date of Patent: Nov. 12, 2019

(54) OPTICAL CHARACTERISTIC MEASURING APPARATUS USING INTERROGATION OPTICAL FIBER, OPTICAL FIBER SENSOR SYSTEM HAVING THE SAME, AND OPTICAL CHARACTERISTIC MEASURING METHOD

(71) Applicant: GWANGJU INSTITUTE OF SCIENCE AND TECHNOLOGY, Gwangju (KR)

(72) Inventors: Bok Hyeon Kim, Gwangju (KR); Kyoung Won Kim, Gwangju (KR); Hoon soo Kang, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 565 days.

(21) Appl. No.: 15/322,039

(22) PCT Filed: Jun. 23, 2015

(86) PCT No.: PCT/KR2015/006394
§ 371 (c)(1),
(2) Date: Apr. 10, 2017

(87) PCT Pub. No.: WO2015/199424
PCT Pub. Date: Dec. 30, 2015

(65) Prior Publication Data
US 2017/0205256 A1    Jul. 20, 2017

(30) Foreign Application Priority Data
Jun. 23, 2014  (KR) .......................... 10-2014-0076273

(51) Int. Cl.
*G01D 5/353* (2006.01)
*G01J 9/00* (2006.01)
*G01J 1/04* (2006.01)

(52) U.S. Cl.
CPC ..... *G01D 5/35374* (2013.01); *G01D 5/35303* (2013.01); *G01J 1/04* (2013.01); *G01J 9/00* (2013.01)

(58) Field of Classification Search
CPC .. G01D 5/35374; G01D 5/3537; G01D 5/353; G01D 5/35303; G01D 5/35338;
(Continued)

(56) References Cited

U.S. PATENT DOCUMENTS

| | | | | |
|---|---|---|---|---|
| 4,669,872 A | * | 6/1987 | Ida | ........................ G01K 11/12 356/43 |
| 9,435,668 B2 | * | 9/2016 | Lewis | ................ G01D 5/35358 |

(Continued)

FOREIGN PATENT DOCUMENTS

| | | |
|---|---|---|
| KR | 10-2002-0011149 A | 2/2002 |
| KR | 10-2003-0067352 A | 8/2003 |

(Continued)

OTHER PUBLICATIONS

International Search Report dated Oct. 19, 2015 corresponding to International Application PCT/KR2015/006394.

*Primary Examiner* — John R Lee
(74) *Attorney, Agent, or Firm* — Hauptman Ham, LLP

(57) ABSTRACT

The disclosure relates to an optical characteristic measurement system including at least: a light source unit which outputs an input beam of a specific wavelength; a sensing unit which generates a signal beam by using a sensor whose optical characteristic is affected by an external environment condition; and a measuring unit which derives varied physical amount by using the signal beam delivered from the (Continued)

sensing unit, wherein the measuring unit includes: an optical coupler which distributes the signal beam into the two optical paths; and an interrogation optical fiber which is arranged on one of the paths on which the signal beam travels. The interrogation optical fiber has a linear light absorption characteristic in the specific wavelength range, and the light intensity of the signal beam is measured to detect a wavelength of the signal beam delivered from the sensing unit, and finally derive the physical amount applied from outside.

20 Claims, 26 Drawing Sheets

(58) Field of Classification Search
CPC ........... G01D 5/35341; G01D 5/35345; G01D 5/35351; G01D 5/3538; G01D 5/35383; G01D 5/35387; G01D 5/3539; G01D 5/35393; G01D 5/35396; G01J 1/04; G01J 3/00; G01J 1/54; G01L 1/24; G01K 11/32; G02B 6/02; G02B 27/62; G02B 6/00
See application file for complete search history.

(56) References Cited

U.S. PATENT DOCUMENTS

| | | | | |
|---|---|---|---|---|
| 2004/0052522 A1* | 3/2004 | Fishteyn | ......... | H04B 10/07951 398/29 |
| 2004/0094716 A1* | 5/2004 | Evan Webber | .... | G01N 21/1702 250/339.12 |
| 2004/0175180 A1* | 9/2004 | Sugaya | ................ | H04B 10/077 398/85 |
| 2006/0029322 A1* | 2/2006 | Mihailov | ........... | G02B 6/02138 385/12 |
| 2006/0131488 A1* | 6/2006 | Thingbo | .............. | G01D 5/3539 250/227.23 |
| 2008/0018904 A1* | 1/2008 | Waagaard | ............. | G01D 5/3539 356/478 |
| 2008/0106745 A1* | 5/2008 | Haber | .................... | G01B 11/18 356/519 |
| 2008/0219618 A1* | 9/2008 | McCarthy | .......... | G01D 5/35303 385/13 |
| 2009/0274456 A1* | 11/2009 | Healey | ............... | G01D 5/35303 398/28 |
| 2011/0255078 A1* | 10/2011 | Goldner | .................. | H04J 14/02 356/73.1 |
| 2012/0280117 A1* | 11/2012 | Lewis | ...................... | G01D 1/00 250/227.17 |
| 2013/0301115 A1* | 11/2013 | Dong | .................. | H01S 3/06716 359/337.5 |
| 2014/0211202 A1* | 7/2014 | Niewczas | .......... | G01D 5/35316 356/73.1 |
| 2014/0326078 A1* | 11/2014 | Arkwright | ......... | G01K 11/3206 73/862.624 |
| 2015/0097110 A1* | 4/2015 | Sakai | ...................... | G01B 11/18 250/227.14 |
| 2017/0205256 A1* | 7/2017 | Kim | ................... | G01D 5/35374 |
| 2017/0328808 A1* | 11/2017 | Jaaskelainen | ...... | G01D 5/35383 |
| 2018/0136206 A1* | 5/2018 | Kim | ..................... | G01N 33/587 |

FOREIGN PATENT DOCUMENTS

| | | |
|---|---|---|
| KR | 10-2003-0088599 A | 11/2003 |
| KR | 10-2013-0060551 A | 6/2013 |
| KR | 10-101297421 B1 | 8/2013 |

* cited by examiner

PRIOR ART

PRIOR ART

PRIOR ART

OPTICAL CHARACTERISTIC MEASURING APPARATUS USING INTERROGATION OPTICAL FIBER, OPTICAL FIBER SENSOR SYSTEM HAVING THE SAME, AND OPTICAL CHARACTERISTIC MEASURING METHOD

CROSS REFERENCE TO RELATED APPLICATION

This application claims the benefit of Korean Patent Application No. 10-2014-0076273, filed on Jun. 23, 2014, entitled "OPTICAL CHARACTERISTICS MEASURING APPARATUS USING INTERROGATION OPTICAL FIBER, OPTICAL FIBER SENSOR SYSTEM COMPRISING THE SAME AND METHOD FOR MEASURING OPTICAL CHARACTERISTICS". Further, this application is the National Phase application of International Application No. PCT/KR2015/006394, filed Jun. 23, 2015, which designates the United States and was published in Korean. Both of the priority documents are hereby incorporated by reference in their entireties.

TECHNICAL FIELD

The present invention relates to a technology of measuring an optical characteristic using an interrogation optical fiber and, more specifically, to an optical characteristic measuring apparatus using an interrogation optical fiber, an optical fiber sensor system having the same, and a method of measuring the optical characteristic.

BACKGROUND ART

An optical fiber sensor or an optical fiber sensor system which has attracted much interest these days is characterized in that all or a part of it is made of an optical fiber, and it can be divided into an intrinsic type in which a sensing unit itself for measuring a physical amount is made of an optical fiber and an extrinsic type in which the optical fiber only serves as a light source and a means for delivering an optical signal.

Generally, the optical fiber sensor or the optical fiber sensor system uses light for measuring, and therefore it does not consume electricity differently from an electric sensor based on a semiconductor or a conductive material. Therefore, dangers such as a noise due to an electromagnetic wave interference generated from around, a breakage due to electric leakage, and an electric shock, etc. can be prevented for the optical fiber sensor or the optical fiber sensor system. Also, the optical fiber sensor or the optical fiber sensor system is small, lightweight, and has a good sensitivity. In this regard, the optical fiber sensor or the optical fiber sensor system can be utilized for measuring various types of physical amounts. For example, the optical fiber sensor can measure a variation in various physical amounts such as a temperature, a strain, a bending, a torsion, a pressure, a refractive index, a concentration, a PH, an optical power, a current, a voltage, etc.

The optical fiber sensor has a better environmental resistance and a longer lifetime than an electrical sensor, has a superb reproducibility due to a small plastic deformation, and enables a long-distance measuring system to be developed since it uses light as a measuring means. Also, it is possible to develop a high speed mass capacity measuring system using a single line by adopting a wavelength division multiplexing (WDM) technology and a time division multiplexing (TDM) technology. Although it had been expected that the optical fiber sensor would replace conventional electrical sensors very quickly thanks to these advantages, advances in commercialized technologies in optical characteristic analysis and measurement fields are relatively small, which acts as an obstacle in expanding related markets.

The optical fiber sensor system can mainly be configured with a light source unit serving as a measuring light source, a sensing unit which varies a characteristic of light (an input beam) delivered from the light source unit according to a physical amount applied from an external environment, and a measuring unit which measures and analyzes the characteristic of the light varied by the sensing unit. In particular, in the measuring unit, a detecting unit for detecting the light and a signal analysis device for deriving the physical amount play an important role in the performance of the overall sensor system.

Among various optical fiber sensor systems, a scheme which applies an optical fiber Bragg grating (FBG) to the sensing unit and analyzes a shift of an optical wavelength generated in the FBG to measure the physical amount is widely used. That is, when the optical fiber Bragg grating (FBG) is used for the sensing unit, the FBG reflects a portion of the input beam delivered from the light source unit to generate a band type optical signal with a constant width, and configures the sensor system by using a movement characteristic of a central wavelength (or a resonance wavelength) of this optical band. Also, in this category, there is a sensor system using a long period optical fiber (LPFG), a Fabry-Ferot filter, and an optical element utilizing optical phenomena such as a Brilliouin scattering, a stimulated Brilliouin scattering (SBS), a Raman scattering a Mie scattering, a coherent anti-stokes Raman scattering (CARS), an optical parametric generation, a sum frequency generation (SHG, THG), a difference frequency generation, a four wave mixing (FWM), etc.

That is, all optical signals are made in band shapes and central (resonance) wavelengths of the bands are moved according to an applied physical amount such as a temperature, a strain, a refractive index, etc. Then the moved central wavelengths of the bands are measured to analyze a variation value of the physical amount. Although the optical element for a sensing unit used in the optical fiber sensor system should not necessarily be configured as an optical fiber, it is preferred that the whole part or at least an input unit and an output unit of the optical element are made as an optical fiber when considering an optical connectivity with the optical fiber element configuring the rest part of the optical fiber sensor system. In case of the optical fiber sensor system using various optical elements as the sensing unit, since a band type optical signal (signal beam) is generated in the sensing unit and a shift of a central wavelength of the signal beam due to an environment variation is measured to derive the physical amount, a measuring device (an interrogation device), which detects a wavelength variation and derives the physical amount from the detected wavelength variation, has to be included in the sensor system.

In order to accomplish this, according to the prior art, various optical characteristic analysis devices using an interrogation technology based on a bulk optic filter, an optical fiber coupler, and an optical fiber grating, as well as an optical fiber sensor technology using the same have been developed.

FIG. 1 shows an optical fiber sensor system based on an optical characteristic measuring device which uses a bulk optic filter element according to the prior art. In the prior art as shown in FIG. 1, a bulk optic filter element such as an edge Filter and a band pass filter having a transmission characteristic with a constant slope is used as the interrogation element. The optical fiber sensor system which uses the bulk optic filter element such as the edge filter and the band pass filter needs an optical coupling between the bulk optic filter element and different optical fiber elements in order to reproduce necessary optical characteristics. The prior art has a drawback in that a precise optical alignment procedure, which requires much time and cost, and an additive optical component such as a collimator are needed to realize the optical coupling.

Furthermore, additional components such as a housing are required to protect the optical fiber components configured with bulk optics from contamination and external vibrations and to realize a stable optical characteristic, which makes an overall configuration complex. Generally, the bulk optic filter element also has drawbacks in that it is manufactured by depositing plural thin films on a substrate material by using a high vacuum deposition process, and it requires various high cost processes since an anti-reflection coating is needed to reduce an optical loss due to the reflection occurring on a surface exposed to air.

Also, after the bulk optic filter is manufactured, it is impossible to further adjust a thickness of the element for controlling the light absorption (optical absorption) characteristic (for example, a light absorption intensity and a slope) in order to obtain a precise interrogation performance, and, therefore, the filter element has to be manufactured individually according to the specification of the different sensor system.

FIG. 2 shows an optical fiber sensor system based on an optical characteristic measuring device which uses an optical fiber coupler according to the prior art. As shown in FIG. 2, an optical fiber coupler having a transmission spectrum with a constant slope can be used as an interrogation element as another interrogation method for measuring optical characteristics. In this optical characteristic analysis system adopting the optical fiber coupler as above, a coupled signal and a transmitted signal cross each other to improve sensitivity. However, it is very hard to manufacture an optical coupler which has the optical characteristic with a linear optical absorption slope and can precisely represent this optical characteristic.

In general, also, since the optical characteristic of the optical fiber coupler is easily affected by an external environment such as a polarization characteristic of light, a temperature, a vibration, etc., a complex device configuration and an additional process technology are required to solve this problem, which results in drawbacks.

FIG. 3 shows an optical fiber sensor system based on an optical characteristic measuring device which uses a long period fiber grating according to the prior art. As shown in FIG. 3, an optical characteristic analysis device adopting a transmission spectrum characteristic of a long period optical fiber grating having a slope is supposed as another interrogation method for measuring the optical characteristics.

In this method as above, since the sensor system is configured as an optical fiber, a problem due to an optical alignment can be solved; however, it is very hard to manufacture optical fiber gratings having the same characteristics with high reproducibility. Also, since an optical characteristic itself of the long period optical fiber grating for interrogation, which is supposed to be stable with respect to peripheral environment, is generally very sensitive to a vibration and a temperature and shows a polarization dependent characteristic, it is very difficult to commercialize this type of sensor system.

DETAILED DESCRIPTION OF THE INVENTION

Technical Problem

The present invention is proposed to solve the aforementioned problems, and an objective of the present invention is to provide an optical characteristic measuring device, which improves performance and efficiency of a sensor system by using an optical fiber having a linear light absorption, reproducibility with the same absorption characteristic, safety, and no polarization-dependency, and an optical fiber sensor system using the optical characteristic measuring device.

Another objective of the present invention is to provide an optical fiber sensor system in which the configuration of an optical characteristic measuring device is simplified to finally reduce the manufacturing cost by a large amount compared to conventional systems, and which can be modified in various shapes.

Technical Solution

An optical characteristic measuring device according to an embodiment of the present invention is an optical characteristic measuring device which constitutes a measuring unit for measuring and analyzing an optical signal generated in a sensor of an optical fiber sensor system, comprising: a first optical coupler which distributes the signal beam into two optical paths; an interrogation optical fiber which is arranged on one optical path on which the signal beam travels; and
a detecting unit which detects a light intensity of the signal beam, which has passed through the interrogation optical fiber, and a light intensity of a reference beam which is delivered to the other optical path by the first optical coupler, and
wherein the optical characteristic measuring device is characterized in that the interrogation optical fiber has a linear light absorption characteristic in a predetermined wavelength range, and the physical amount applied to the sensing unit is derived by comparing the light intensity of the signal beam with the light intensity of the reference beam which are detected by the detecting unit.

The optical fiber sensor system according to an embodiment of the present invention comprises: a light source unit which outputs an input beam of a predetermined wavelength; a sensing unit which receives the input beam by using a sensor, whose optical characteristic is varied according to an applied physical amount, and generates a signal beam; a measuring unit which derives the physical amount applied to the sensing unit by using the signal beam which is delivered from the sensing unit; and a second optical coupler which delivers the input beam, which leaves the light source unit, to the sensing unit, and distributes the signal beam, which is generated in the sensing unit, to the measuring unit, wherein the optical fiber sensor system is characterized in that the measuring unit includes: a first optical coupler which distributes the signal beam into two optical paths; an interrogation optical fiber which is arranged on one optical path on which the signal beam travels; and a detecting unit which detects a light intensity of the signal beam, which has passed through the interrogation optical fiber, and a light intensity of a reference beam which is delivered to the other optical path by the first optical coupler, and that the interrogation optical fiber linearly absorbs light in a predetermined wavelength range, and the physical amount applied to the sensing unit is derived by comparing the light intensity of the signal beam with the light intensity of the reference beam which are detected by the detecting unit.

The interrogation optical fiber is an optical fiber having a linear section in a light absorption coefficient within a predetermined wavelength range, a material having a linear light absorption characteristic in the predetermined wavelength range is added (doped) to the optical fiber during a manufacturing process of the optical fiber, and a light absorption intensity of the interrogation optical fiber is varied by adjusting an amount of the material having the light absorption characteristic in the predetermined wavelength range or by adjusting a length of the interrogation optical fiber such that a light absorption intensity and a slope can be varied.

An optical characteristic measuring method according to an embodiment of the present invention comprises: a step of outputting an input beam having a predetermined wavelength from a light source unit to a sensing unit; a step in which the sensing unit receives the input beam to generate a signal beam and a central wavelength of the signal beam is varied according to a physical amount applied from outside, a light intensity of the signal beam is varied according to the light absorption coefficient of the interrogation optical fiber while the signal beam passes through an interrogation optical fiber arranged in the measuring unit; and a step of deriving a wavelength of the signal beam according to the light intensity.

And, the interrogation optical fiber is an optical fiber which has a linear light absorption coefficient at a predetermined wavelength range, the optical fiber is doped with a material with a predetermined light absorption characteristic during an optical fiber manufacturing process, and the optical characteristic measuring method can further comprise the step of deriving the physical amount applied to the sensing unit by deriving the wavelength of the signal beam.

Advantageous Effects

According to an embodiment of the present invention, the measuring unit used in the optical fiber sensor system is made only of an optical fiber, which does not need an optical alignment and improves reliability of measured data.

According to an embodiment of the present invention, only an interrogation optical fiber has to be connected inside part of the measuring unit for analyzing optical characteristics for an optical element, and, therefore, the sensor system can be easily configured and the manufacturing cost can be decreased. Also, it is possible to control a light absorption slope according to the characteristic of the system by adjusting a length of the optical fiber, or the type, the composition, and the concentration of an additive material. Also, since it utilizes the light absorption characteristic of the material added to the optical fiber, it is possible to suppress a polarization dependency and improve reproducibility.

Also, since a measured value is not strongly affected by frequently varied external environment conditions such as the vibration, the pressure, and the temperature, which affect the measuring system, and thus stability of the system can be improved.

BEST MODE

In the following, embodiments of the invention are explained in detail by referring to the appended figures. However, the present invention is not restricted to the illustrated embodiments of the present invention. When explaining the present invention in detail, detailed explanations on a known function or a known configuration can be omitted in order to clarify a subject matter of the present invention.

Figure 1:
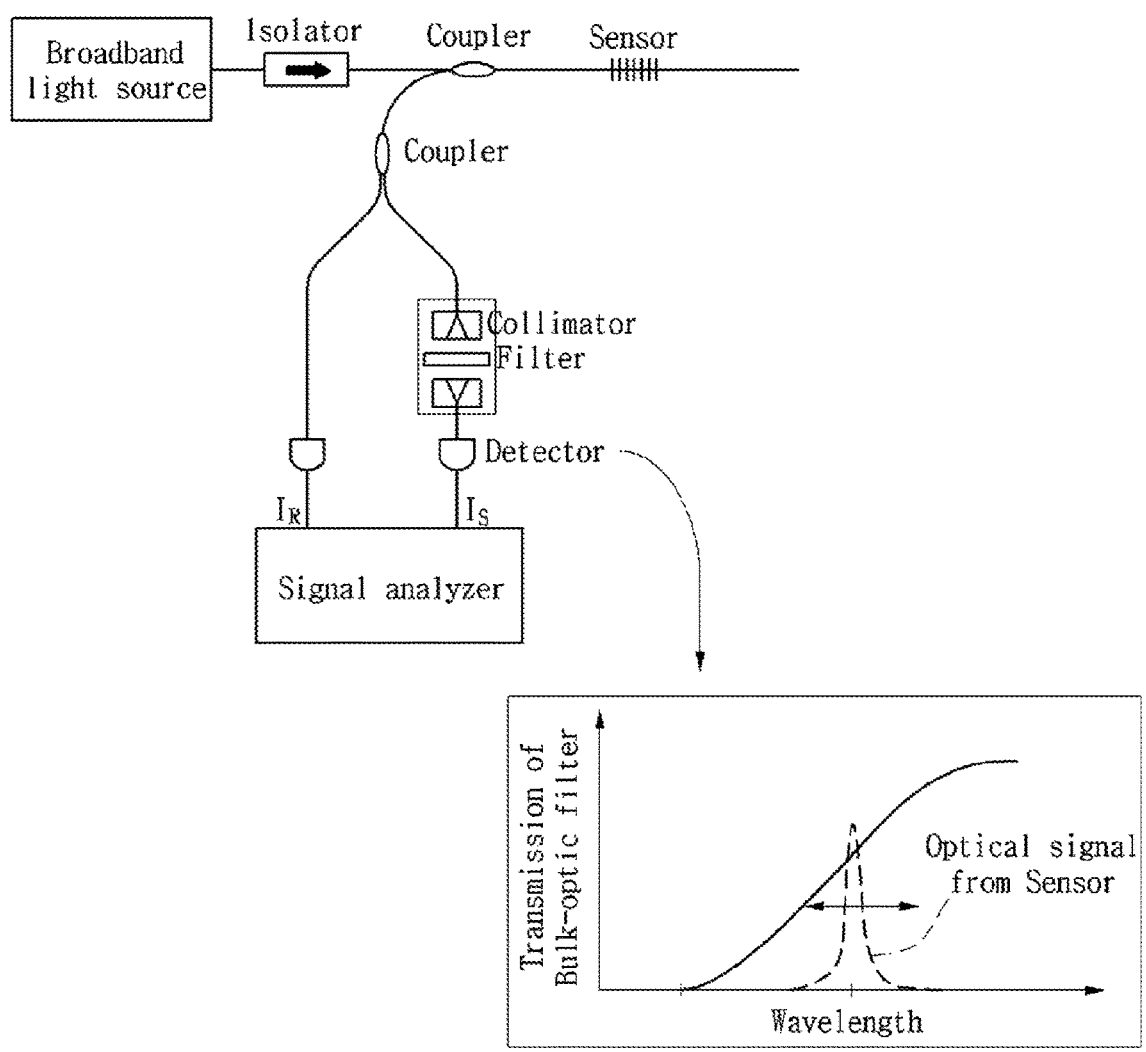
FIG. 1 is a diagram showing an optical fiber sensor system based on an optical characteristic measuring device which uses a bulk optic filter element according to the prior art.
Figure 2:
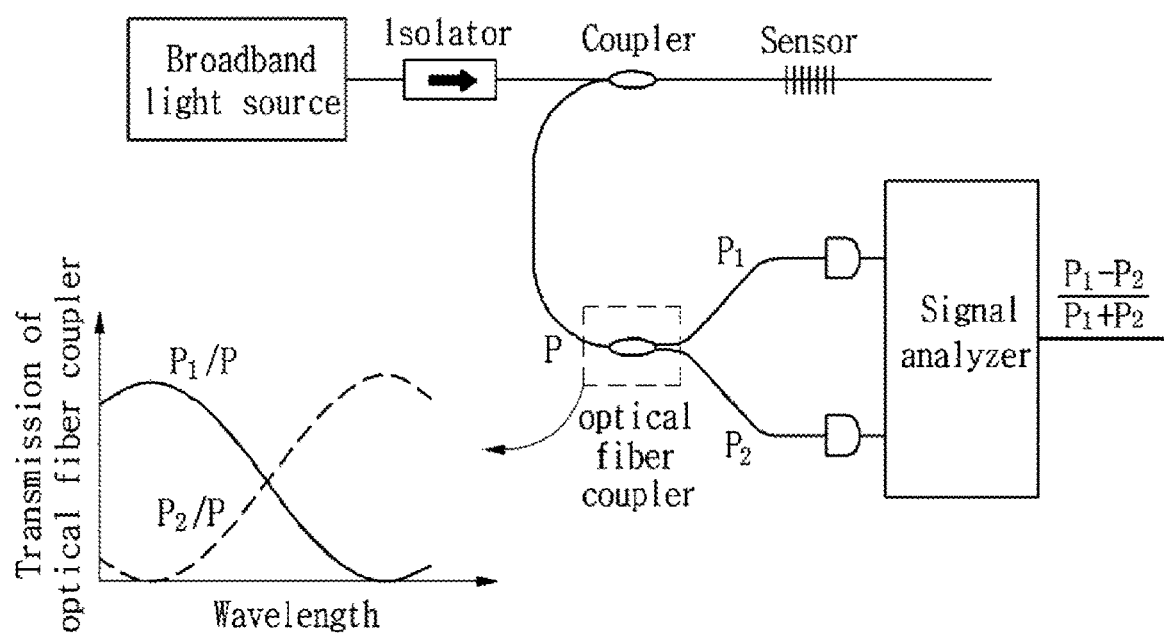
FIG. 2 shows an optical fiber sensor system based on an optical characteristic measuring device which uses an optical fiber coupler according to the prior art.
Figure 3:
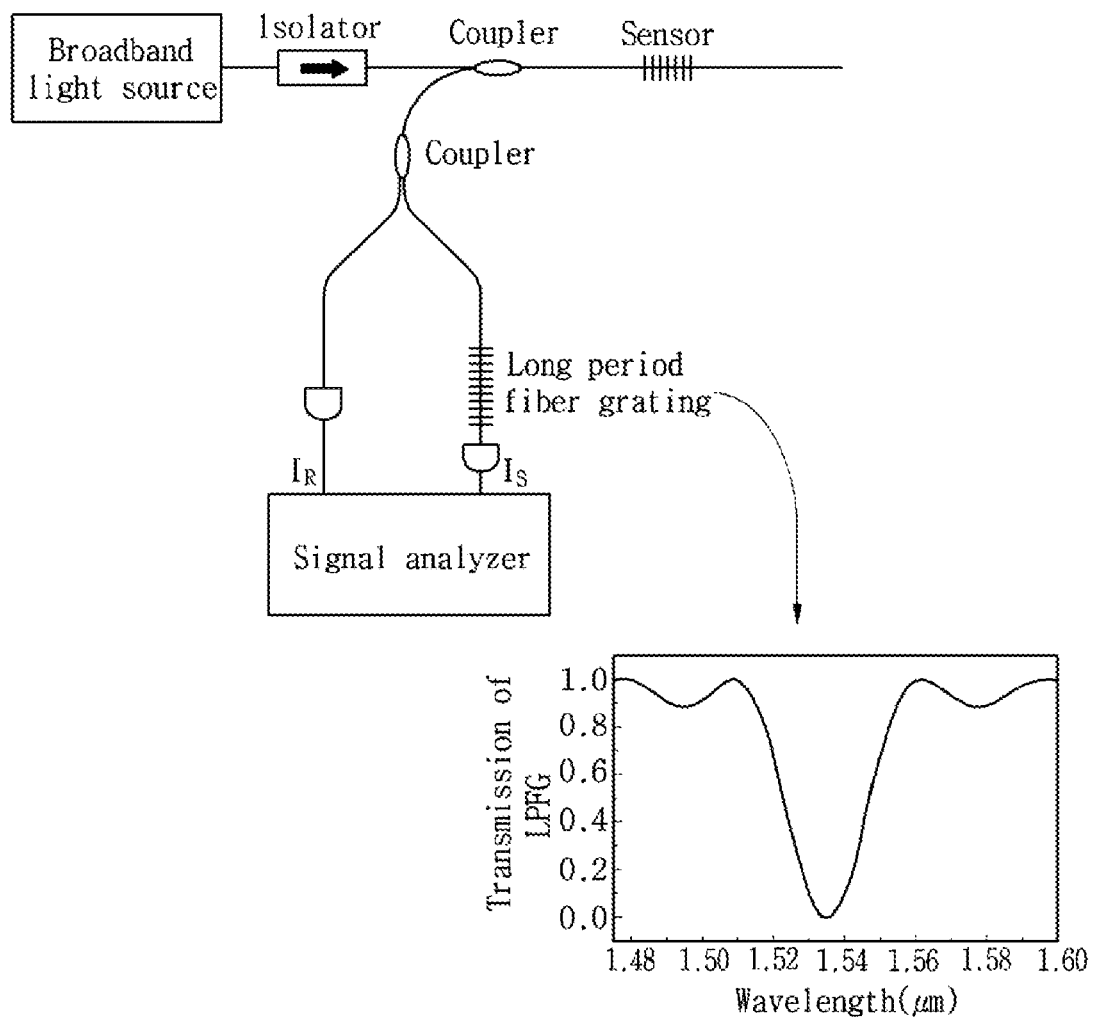
FIG. 3 shows an optical fiber sensor system based on an optical characteristic measuring device which uses a long period fiber grating according to the prior art.
Figure 4A:
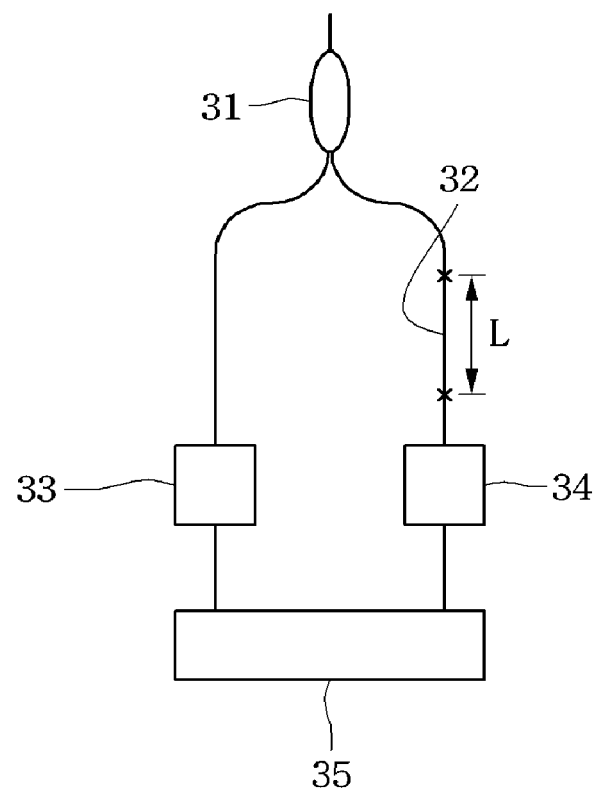
FIG. 4A is a diagram showing an optical characteristic measuring device according to an embodiment of the present invention.

FIG. 4A is a diagram showing an optical characteristic measuring device according to an embodiment of the present invention; When referring to FIG. 4A, an optical characteristic measuring device 30 represents a measuring unit which is arranged in an optical fiber sensor system and derives a physical amount varied in a sensing unit.

The optical characteristic measuring device 30 can comprise a first optical coupler 31, an interrogation optical fiber 32, sensing units 33, 34, and an analyzing unit 35. The first optical coupler 31 divides a delivered optical signal according to a preset ratio and delivers a divided result into a pair of optical output lines which are connected with the first optical coupler 31.

A first detecting unit 33 for receiving a portion of the signal beam delivered from the sensing unit as a reference beam without an optical attenuation due to an interrogation optical fiber and detecting a light intensity of the reference beam is arranged on one of the optical output lines. Also, on the other optical output line, an interrogation optical fiber 32 having a length L is arranged on another travel path of the signal beam which is delivered from the sensing unit.

The divided optical signal, which has been divided by the first optical coupler 31, travels along the interrogation optical fiber 32, and a second detecting unit 34 can be arranged to detect a light intensity of the signal beam which experiences different optical attenuations according to the wavelength. Also, an analyzing unit 35 can be arranged to calculate a physical amount by analyzing light intensities of the light which is detected by the first and second detecting units. Detailed operations will be explained in more detail along with other configurations included in the following optical fiber sensor system.

SUMMARY OF THE INVENTION

Figure 4B:
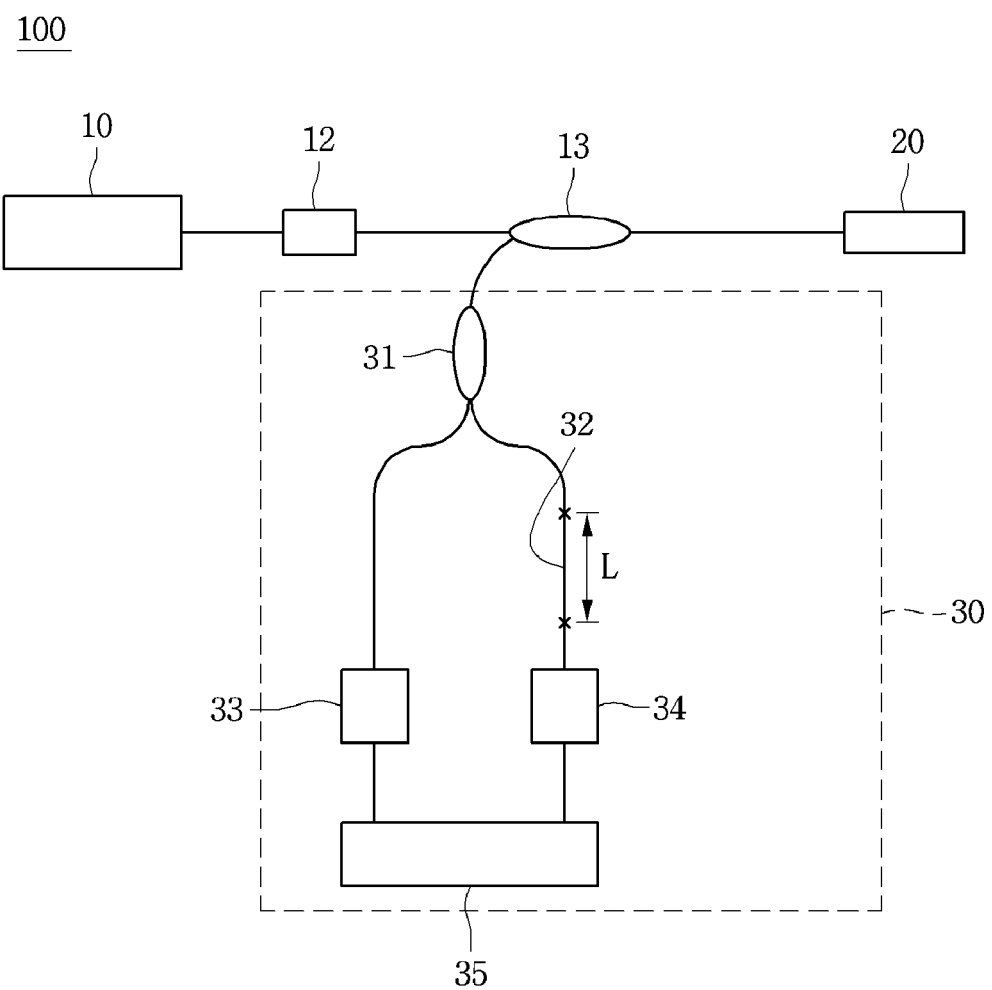
FIG. 4B is a diagram showing an optical fiber sensor system having an optical characteristic measuring device according to an embodiment of the present invention.

FIG. 4B is an illustration of an optical fiber sensor system according to an embodiment of the present invention.

When referring to FIG. 4B, the optical fiber sensor system 100 according to an embodiment of the present invention can comprise a light source unit 10, a sensing unit 20, and a measuring unit 30.

As the light source unit 10, a laser diode (LD), a super luminescent diode (SLD), a Light emitting diode (LED), a semiconductor optical amplifier (SOA)-based light source, a tunable laser source, a sweeping source, a broadband source, a white light source, a solid state laser, a gas laser, a dye laser, etc. can be used as a light source for outputting light at a predetermined wavelength. Also, a band-pass filter can be used in the light source unit in order to restrict a light source spectrum into an optical band of a predetermined range.

The sensing unit 20 includes an optical element (sensor) which converts an input beam outputted from the light source unit 10 to an optical signal (signal beam). The sensing unit 20 varies a wavelength of the signal beam according to an environmental variation, that is, a variation in the physical amount applied from outside. As an example, the sensing unit 20 can be an optical fiber element based on a fiber Bragg grating (FBG). The optical fiber sensor using the FBG in the sensing unit is manufactured by engraving the Bragg grating at a constant distance on the optical fiber, and uses the characteristic that a wavelength of light reflected from the grating (grid) is varied according to the variation of an external environment (a physical amount applied from outside) such as a temperature, a tension, a pressure, and a bending, etc. When a peripheral temperature varies or a physical amount such as a tension is applied to the grating, a refractive index or a length of the grating portion is changed, which moves a central wavelength (resonance wavelength) of the reflected light. Therefore, it is possible to detect and analyze a variation in the physical amount by measuring the wavelength of the light reflected from the FBG.

As another example, the sensing unit 20 can be an optical element which uses a long period optical fiber grating (LPFG), a Fabry-Perot filter, a Brilliouin scattering, a stimulated brillouin scattering (SBS), a Raman scattering, a Mie scattering, a coherent anti-stokes Raman scattering (CARS), an optical parametric generation process, a sum frequency generation (SFG) process, a second harmonic generation (SHG) process, a third harmonic generation (THG) process, a difference frequency generation (DFG), a four wave mixing (FWM) process, etc. That is, all of these reflect the band type optical signals, a resonance frequency of the band is moved according to a variation in a temperature, a strain, a refractive index, etc., and this variation can be measured to analyze the variation in the physical amount. The optical element, which is used in the sensing unit 20 to generate the signal beam, can be made by an optical fiber element, and it can have other configurations other than the optical fiber. When the optical element has other configurations than the optical fiber, it is preferred that an input unit and an output unit of the optical element used in the sensing unit 20 are made of the optical fiber in order to facilitate an optical coupling between the sensing unit 20 and another element used in the optical fiber sensor system 100.

When an optical element such as the FBG, the LPFG, and the Fabry-Perot filter is used in the sensing unit, it is preferred that an LD, an SLD, an LED, a broadband source or a Tunable laser source, a sweeping source, etc. having a constant band is used in the light source unit 10 as the light source. In the meantime, when a nonlinear optical element such as a Raman scattering, SBS, FWM, etc. is used in the sensing unit, a laser light source such as a solid state laser, a gas laser, a dye laser, a Tunable laser source, etc., which resonates at a single wavelength is used in the light source unit 10.

An optical isolator 12, which passes the light only in one direction and blocks the light reflected in a reverse direction to protect the light source unit 10 and reduce a distortion in the optical signal, can be arranged between the light source unit 10 and the sensing unit 20. And, a second optical coupler 13, which distributes or couples the light from the light source unit 10, can be arranged. The second optical coupler is preferably an optical fiber coupler. Also, a beam splitter, a planar light circuit (PLC) type optical coupler, a planar light circuit type optical splitter, etc. can be used as the second optical coupler. Also, it is preferred that an input unit and an output unit of the second optical coupler are made of an optical fiber in order to facilitate an optical coupling.

And, the present invention is characterized in the measuring unit 30 for measuring and analyzing the optical signal, which has been generated in and delivered from the sensing unit 20, and, therefore, the configuration of the measuring unit 30 is explained in more detail. A first optical coupler 31 is arranged to be connected with a second optical coupler 13 arranged between the optical isolator 12 and the sensing unit 20, and a pair of optical output lines (optical paths) are connected with the first optical coupler 31. The first optical coupler is preferably an optical fiber coupler, and can use a beam splitter, a beam combiner, a planar light circuit type optical coupler, a planar light circuit type optical splitter, etc. Also, it is preferred that the input unit and the output unit of the first optical coupler are made of an optical fiber in order to facilitate an optical coupling.

A first detecting unit 33 for receiving a portion of the signal beam delivered from the sensing unit as a reference beam without an optical attenuation by an interrogation optical fiber and detecting a light intensity of the reference beam is arranged on one of the optical output lines, and, on the other optical output line, an interrogation optical fiber 32 with a length L is arranged on a travel path of the signal beam delivered from the sensing unit 20. A second detecting unit 34 for detecting a light intensity of the signal beam, which has experienced different optical attenuations according to the wavelength while propagating through the interrogation optical fiber 32, can be provided. Also, an analyzing unit 35 can be arranged to calculate a physical amount by analyzing light intensities of the light which is detected by the first and second detecting units.

Also, more specifically, the present invention is characterized in the interrogation optical fiber 32 used in the measuring unit 30, and the interrogation optical fiber simply needs to be connected with other optical fiber path of the measuring unit 30 via a simple method such as a fusion splicing and a butt coupling. Therefore, no optical alignment is necessary, which stably operates an overall system irrespective of the vibration generated from outside. The interrogation optical fiber 32 has a linear light absorption characteristic and can be controlled easily to have the characteristic required for the system such as a light absorption wavelength, a slope, an intensity, etc. by adjusting the type and the concentration of an added material. The interrogation optical fiber 32 has a linear light absorption characteristic and can be controlled easily to have the characteristic required for the system such as a light absorption wavelength, a slope, an intensity, etc. by adjusting the type and the concentration of an added (doped) material. Also, when the interrogation optical fiber 32 according to the present invention is used, it uses the light absorption characteristic of the added material, and, therefore, it can prevent polarization dependency and can guarantee a stable measured value even with a varying environment in which the temperature or the pressure varies frequently from other interrogation techniques. Also, the length L of the interrogation optical fiber 32 used in the measuring unit 30 can be adjusted easily to change the light absorption intensity and the slope, which comes to be a major advantage.

More particularly, the input beam outputted from the light source unit 10 is delivered to the sensing unit 20 by way of the optical isolator 12 and the second optical coupler 13, and the signal beam is generated by the optical element in the sensing unit. And, the optical element in the sensing unit is affected by an external environment variation, which results in a variation in the wavelength of the signal beam. Then, the signal beam propagates to the second optical coupler 13.

Then, the first optical coupler 31, which is connected with the second optical coupler 13, distributes the signal beam delivered from the light source unit 10 in two directions along with a pair of optical output lines. That is, a portion of the signal beam serves as a reference beam which sets a reference point of an initial light intensity. Then, the rest portion of the signal beam experiences an additional optical loss by the interrogation optical fiber 32, and, as a result, comes to be a signal beam having an attenuated light intensity varied according to a position of the resonance wavelength, and then measured by the second sensing unit 34. Here, the reason why the reference beam is used for measuring is that the initial spectrum of the light source unit 10 can have different outputs according to the wavelengths, and that it is required to suppress an optical signal distortion element generated when the intensity of the input beam, which is outputted from the light source unit and delivered, is varied as time passes or due to external effects. Therefore, it is very important to measure the light intensity of the reference beam by using the first detecting unit 33 in order to guarantee accuracy and stability of the optical fiber sensor system. Many configurations can be used to measure the light intensity of the reference beam, which serves as a reference for an optical analysis, and detailed explanations to the configurations will be given with respect to other embodiments in the following.

When it is necessary in measuring the reference beam and the signal beam, a fixed type or variable light attenuator can be arranged on an optical path where the signal beam or the reference beam passes. Preferably, the light attenuator can be arranged between the second optical coupler 13 and the first optical coupler 31, between the first optical coupler 31 and the first detecting unit 33, or between the first optical coupler 31 and the second detecting unit 34. The light attenuator is required when, for example, the light intensities of the reference beam and the signal beam need to be reduced when they exceed a measurable range. Also, the light attenuator is required when, for example, the light intensities of the reference beam and the signal beam need to be adjusted to be close to each other in a predetermined range. The light attenuator can be a light attenuator which is made of an optical fiber to which a light absorbing material is added.

Then, two light intensities detected in the reference beam and the signal beam by the first and second detecting units 33, 34 are measured and delivered to the analyzing unit 35, and the analyzing unit 35 compares the light intensities with each other to derive and analyze a position of the resonance wavelength of the signal beam, and finally measures the physical amount applied to the sensing unit. According to the present invention, a detailed explanation to a process of deriving the resonance wavelength and deriving the physical amount therefrom performed in the analyzing unit 35 will be given with respect to other embodiments, and a method of composing the optical fiber which can be applied to the embodiments will be explained in the following.

A basic composition of the interrogation optical fiber 32 can be a material made of glass. A glass composition of the optical fiber for interrogation can be an oxide, a chalcogenide, and a fluoride glass which can be easily manufactured by adding the material with a linear light absorption characteristic. The composition of the oxide glass optical fiber for interrogation is preferably a silicate glass or a silica glass. The composition of the oxide glass optical fiber for interrogation is preferably a silica glass for facilitating an optical coupling with a normal silica glass optical fiber, which is widely used in the optical fiber sensor system, by fusion splicing.

Also, the basic composition of the interrogation optical fiber can be a polymer material. The polymer material composition of the optical fiber for interrogation is preferably a poly(methylmethacrylate, PMMA), a polypropylene, a polyethylene, a polystyrene, a teflon, and an acryl(polyacrylates) resin, which are easy to use for manufacturing the optical fiber.

The interrogation optical fiber mainly made of glass is preferably an optical fiber whose diameter is smaller than or equal to 700 µm in order to miniaturize the system. In the interrogation optical fiber mainly made of glass, a diameter of the optical fiber is preferably 125±5 µm in order to facilitate the optical coupling with the glass optical fiber which is widely used in the optical fiber sensor system. The interrogation optical fiber mainly made of the polymer material is preferably an optical fiber whose diameter is smaller than or equal to 2 mm in order to miniaturize the system. In the interrogation optical fiber mainly made of the polymer material, a diameter of the optical fiber is preferably 200-1200 µm in order to facilitate the optical coupling with a normal polymer optical fiber which is widely used in the optical fiber sensor system.

The material which induces a specific light absorption characteristic is characterized in having a light absorption characteristic which monotonously varies in a predetermined wavelength range. More preferably, the material which induces a specific light absorption characteristic is characterized in having a light absorption characteristic which linearly varies in a predetermined wavelength range. Therefore, the material which is added (doped) to the optical fiber to obtain the linear light absorption characteristic is characterized in being selected from the rare earth element, the transition metal, and nanoparticles.

It is preferred that the rare earth element is selected from a group consisting of Tm, Er, La, Ce, Pr, Nd, Pm, Sm, Eu, Gd, Tb, Dy, Ho, Yb, and Lu. It is more preferred that the rare earth element is selected from the group consisting of Tm, Er, Pr, Nd, Pm, Sm, Eu, Tb, Dy, Ho, and Yb which has a better linear light absorption characteristic in a wavelength range of 200-2000 nm for which various optical elements have been developed.

It is preferred that the metal element is selected from the group consisting of Al, Sc, Ti, V, Cr, Mn, Fe, Co, Ni, Cu, Zn, Y, Zr, Nb, Mo, Tc, Ru, Rh, Pd, Cd, In, Sn, Hf, Ta, W, Re, Os, Ir, Pt, Tl, Pb, and Bi. It is more preferred that the metal element is selected from the group consisting of V, Cr, Mn, Fe, Co, Ni, Cu, W, Tl, Pb, and Bi which has a better linear light absorption characteristic in a wavelength range of 200-2000 nm for which various optical elements have been developed.

Although the rare earth element and the metal element, which induce a specific light absorption characteristic, are preferably added in an ionized state such as +1, +2, +3, they can also be added as a neutral atom or a diatomic material when necessary.

It is preferred that the nanoparticles are selected from the group consisting of Ag, Au, Cu, Si, Ge, Bi, Pb, Ti, Sn, PbS, PbSe, PbTe, CdS, CdSe, CdTe, ZnS, ZnSe, ZnTe, SnS, SnSe, SnTe, CuCl, and $CuCl_2$.

As for the optical fiber Bragg grating (FBG) which is widely used in the sensing unit for the optical fiber sensor system, an amount of movement of a central wavelength due to a variation in an external environment such as the strain, the temperature, the pressure, etc. only amounts to a few nanometers. As for the interrogation optical fiber to which the rare earth element, the transition metal element, and the nanoparticles are added, the wavelength range in which the linear light absorption characteristic is obtained can be in a range more than a few nanometers to a few tens of nanometers, and therefore, the linear light absorption characteristic is sufficient to be used in the optical fiber sensor system.

The material which is added to the optical fiber for interrogation have different light absorption characteristics with different wavelength ranges, slopes and intensities according to a type, a quantity, and a charged amount of the material. Thus, the type, quantity, and the charged amount of the material to be added is determined according to specifications of the desired overall optical characteristics such as a wavelength range, an absorption slope and an intensity, etc. that are to be analyzed.

The slope according to the light absorption coefficient can be easily varied by simply varying the length of the interrogation optical fiber or adjusting the type, the composition, and the concentration (amount) of the material to be added. In particular, since an optical output range of the light source unit 10 used in the optical fiber sensor system, a detecting range of the sensing units 33, 34, and other optical components 12, 13, 20, 31 used in the sensor system also have various loss ranges, the light absorption intensity of the optical element for interrogation used in the measuring unit also has to be properly adjusted. Even after the interrogation optical fiber according to the present invention is manufactured, it is still possible to adjust the length of the interrogation optical fiber, and it is also possible to easily vary the overall light absorption slope, the intensity, and the distribution characteristics of the signal beam passing through interrogation optical fibers, by connecting interrogation optical fibers, which are doped with different materials for inducing the light absorption characteristics, in series.

Prices of raw materials of the rare earth element, the transition metal element, and the nanoparticles can be very high. Since the interrogation optical fiber according to the present invention is manufactured by adding a material for inducing light absorption into a micro-optical fiber with a diameter of a few hundreds of micrometers, a small amount of the raw material is used, which greatly reduces the cost for manufacturing.

Also, since as for the interrogation optical fiber according to the present invention, the interrogation optical fiber with a length of a few hundreds of meters to a few tens of kilometers can be obtained from a single glass preform for an optical fiber during an optical fiber manufacturing process, and the optical characteristics of the interrogation optical fiber can be nearly the same, which results in an interrogation device with a superb reproducibility.

Table 1 shows major wavelength ranges representing linear light absorption characteristics according to the type of major additive materials added to the interrogation optical fiber according to the present invention. As for the optical fiber to which the rare earth element or the transition metal element is added, an absorption band representing the linear light absorption characteristic exists in a specific wavelength range according to the type of the added material, and this characteristic is selected to be matched with the specification required by the optical characteristic measuring system.

As for the optical fiber to which $Tm^{3+}$ or $Tm^{2+}$ is added, it is preferred that an overall wavelength range showing the linear light absorption characteristic in the ranges of 650-673 nm, 680-705 nm, 730-768 nm, 770-830 nm, 1098-1147 nm, 1234-1259 nm, 1180-1230 nm, and 1490-1565 nm or a partial range thereof is used for interrogation. In particular, it is much more preferred that the wavelength range of 1490-1565 nm, for which various optical components for the sensing unit such as the optical fiber Bragg grating are developed, is used for interrogation, and as for the optical fiber to which $Tm^{2+}$ is added, it is possible to utilize the linear light absorption characteristic in a wider wavelength range than the case when $Tm^{3+}$ is added. As for the $Er^{3+}$-added optical fiber, it is preferred that the overall wavelength range showing the linear optical characteristic in the ranges of 785-794 nm, 955-972 nm, 972-978 nm, 981-990 nm, 990-1008 nm, 1453-1482 nm, 1500-1545 nm, and 1550-1567 nm, or a partial range thereof is utilized for interrogation. It is much more preferred that the ranges of 955-972 nm, 990-1008 nm, 1453-1482 nm, and 1550-1567 nm, which show a very linear light absorption characteristic, are used for interrogation. In particular, it is much more preferred that the wavelength range of 1550-1567 nm, which shows the very linear light absorption characteristic and for which various optical components for the light source unit and the sensing unit such as the optical fiber Bragg grating are developed, is used for interrogation.

As for an $Yb^{3+}$-added optical fiber, it is preferred that an overall wavelength range showing the linear light absorption characteristic in the ranges of 864-908 nm, 910-950 nm, and 955-990 nm or a partial range thereof is used for interrogation. As for a $Tb^{3+}$-added optical fiber, it is preferred that an overall wavelength range showing the linear light absorption characteristic in the very wide ranges of 500-700 nm, and 1500-1800 nm, or a partial range thereof is used for interrogation. In particular, it is much more preferred that a range of 1600-1800 nm, which is very wide and shows the optical characteristic with superb linearity, is used for interrogation.

As for an $Ho^{3+}$-added optical fiber, it is preferred that an overall wavelength range showing the linear light absorption characteristic in the ranges of 440-450 nm and 450-460 nm, or a partial range thereof is used for interrogation. As for a $Dy^{3+}$-added optical fiber, it is preferred that an overall wavelength range showing the linear light absorption characteristic in the ranges of 1120-1200 nm, 1240-1300 nm, 1500-1630 nm, and 1680-1740 nm, or a partial range thereof is used for interrogation. In particular, it is much more preferred that the ranges of 1500-1630 nm and 1680-1740 nm, which show the superb optical characteristics, are used for interrogation.

Also, as for a $Pr^{3+}$-added optical fiber, it is preferred that an overall wavelength range showing the linear light absorption characteristic in the ranges of 585-650 nm, 1345-1425 nm, and 1500-1560 nm, or a partial range thereof is used for interrogation. It is much more preferred that a range of 1345-1425 nm, which is very wide and shows the optical characteristic with superb linearity, and a wavelength range of 1500-1560 nm, for which various optical elements for the light source and the sensor are developed, are used for interrogation.

As for a $Nd^{3+}$-added optical fiber, it is preferred that an overall wavelength range showing the linear light absorption characteristic in the ranges of 800-840 nm and 900-940 nm, or a partial range thereof is used for interrogation. As for an $Sm^{3+}$-added optical fiber, it is preferred that an overall wavelength range showing the very linear light absorption characteristic in the ranges of 1040-1070 nm, 1400-1440 nm, and 1470-1520 nm, or a partial range thereof is used for interrogation.

As for the rare earth element added into the interrogation optical fiber, it shows a superb linear light absorption characteristic in the wavelength range of a few nanometers to a few tens of nanometers, and, therefore they can be used for the interrogation device requiring high accuracy. In particular, since the light absorption band around 770-830 nm according to $3H_4$ and the light absorption band around 1180-1230 nm according to $3H_5$ in the optical fiber to which $Tm^{3+}$ or $Tm^{2+}$ is added, the light absorption band around 1500-1545 nm according to $4I_{13/2}$ in the optical fiber to which $Er^{3+}$ is added, and the light absorption band around 955-990 nm according to $2F_{5/2}$ in the optical fiber to which $Yb^{3+}$ is added show a very steep light absorption slope different from other light absorption bands, they can be used for the interrogation device which requires high sensitivity.

As for a V-added optical fiber, it shows the linear light absorption characteristic proper for interrogation in the very wide ranges of 510-610 nm, 910-1030 nm, and 1100-1290 nm, and, therefore, it is preferred that the overall wavelength range or a partial range thereof is used for interrogation. In particular, it is much more preferable that the wavelength range showing the linear characteristic in the ranges of 910-1030 nm and 1100-1290 nm is used.

As for a Cr-added optical fiber, it is preferred that an overall wavelength range showing the linear light absorption characteristic in the range of 600-750 nm, or a partial range thereof is used for interrogation. As for a $Cr^{3+}$-added optical fiber, differently from the Cr-added optical fiber, it shows the linear light absorption characteristic in the ranges of 570-630 nm and 690-8000 nm, and, therefore it is preferred that the overall wavelength range or a partial range thereof is used.

As for a Mn-added optical fiber, it is preferred that an overall wavelength range showing the linear light absorption characteristic in the ranges of 330-390 nm and 500-700 nm, or a partial range thereof is used. As for an Fe-added optical fiber, it is preferred that an overall wavelength range showing the linear light absorption characteristic in the ranges of 500-720 nm and 1670-2000 nm, or a partial range thereof is used. As for an $Fe^{2+}$-added optical fiber, differently from the Fe-added optical fiber, it shows the linear light absorption characteristic in the very wide ranges of 650-100 nm and 1300-2000 nm, and, therefore, it is preferred that the overall wavelength range or a partial range thereof is used. As for a Co-added optical fiber, it is preferred that an overall wavelength range showing the linear light absorption characteristic in the ranges of 320-400 nm, 400-500 nm, 700-770 nm, and 1000-1200 nm, or a partial range thereof is used.

As for an Ni-added optical fiber, it is preferred that an overall wavelength range showing the linear light absorption characteristic in the very wide range of 1100-1600 nm, or a partial range thereof is used. As for an $Ni^{2+}$-added optical fiber, it is preferred that an overall wavelength range showing the linear light absorption characteristic in the ranges of 420-520 nm and 650-750 nm, or a partial range thereof is used.

As for a Cu-added optical fiber, it is preferred that an overall wavelength range showing the linear light absorption characteristic in the range of 250-320 nm, or a partial range thereof is used. As for a $Cu^{2+}$-added optical fiber, it is preferred that an overall wavelength range showing the linear light absorption characteristic in the range of 500-720 nm, or a partial range thereof is used. Also, as for the optical fiber to which Bi, Pb, W or Tl is added as the transition metal element, various light absorption bands that can be used for interrogation are observed in a very wide range of 400-1200 nm, and the wavelength range showing the linear light absorption characteristic in these light absorption bands can be used for interrogation.

As for the transition metal elements added to the interrogation optical fiber, they have advantages in having the linear light absorption characteristic in a very wide wavelength range of a few tens of nanometers to a few hundreds of nanometers, and, therefore, they can be used for the interrogation device which requires a very wide wavelength range.

As for the interrogation optical fiber to which the metal or semiconductor nanoparticles are added, the light absorption bands occur due to the surface plasmon effect or the quantum confinement effect which results in a wavelength range having the linear light absorption characteristic at and around this light absorption band. Therefore, this wavelength range is used for the optical fiber sensor measurement system.

As for an Au or Cu-added optical fiber, it is preferred that an overall wavelength range showing the linear light absorption characteristic in the range of 320-650 nm, or a partial range thereof is used. As for an Ag nanoparticle-added optical fiber, it is preferred that an overall wavelength range showing the linear light absorption characteristic in the range of 300-550 nm, or a partial range thereof is used. As for the optical fiber to which Si, Ge, Ti or Sn nanoparticles are added, it shows the very linear light absorption characteristic in a wide wavelength range of 500-1200 nm, and, therefore, this linear light absorption characteristic in the overall range or a partial range thereof can be used for the interrogation optical fiber.

As for the optical fiber to which CdS, CdSe or CdTe nanoparticles are added, the light absorption band exists 410-880 nm, which is the visible band, and, therefore, it is preferred that the overall range or a partial range thereof is used. As for the optical fiber to which PbS, PbSe or PbTe nanoparticles are added, it is preferred that the overall range or a partial range thereof included in a very wide range of 440-3100 nm is used. Also, as for the optical fiber to which ZnS, ZnSe or ZnTe nanoparticles are added, it is preferred that the overall range or a partial range thereof included in a wavelength range of 300-540 nm is used.

As for the nanoparticles added to the interrogation optical fiber, it is possible to control a position of the wavelength range having the linear light absorption characteristic by adjusting the refractive index of the optical fiber and the size and the distribution of the nanoparticles added, which is an advantage for this type of optical fiber.

Table 1 shows the type and composition of major additive materials that can be added to the interrogation optical fiber, and major wavelength ranges for interrogation according to the additive materials.

TABLE 1

| additive material | band | wavelength range (nm) |
|---|---|---|
| $Tm^{3+}$, $Tm^{2+}$ | $3F_2$, $3F_3$ | 650~673, 680~705 |
| | $3H_4$ | 730~768, 770~830 |
| | $3H_5$ | 1098~1147, 1180~1230, 1234~1259 |
| | $3F_4$ | 1490~1565 |
| $Er^{3+}$ | $4I_{9/2}$ | 785~794 |
| | $4I_{11/2}$ | 955~972, 972~978, 981~990, 990~1008 |
| | $4I_{13/2}$ | 1453~1482, 1500~1545, 1550~1567 |
| $Yb^{3+}$ | $2F_{5/2}$ | 864~908, 910~950, 955~990 |
| $Tb^{3+}$ | $5D_4$, $7F_0$ | 500~700, 1500~1800 |
| $Ho^{3+}$ | $5G_6$ | 440~450, 450~460 |
| $Dy^{3+}$ | $6F_{11/2}$ | 1120~1200 |
| | $6H_{9/2}$ | 1240~1300 |
| | $6H_{11/2}$ | 1500~1630, 1680~1740 |
| $Pr^{3+}$ | $1D_2$ | 585~650 |
| | $3F_4$ | 1345~1425 |
| | $3F_3$ | 1500~1560 |
| $Nd^{3+}$ | $2H_{9/2}$, $4F_{5/2}$ | 800~840 |
| | $4F_{3/2}$ | 900~940 |
| $Sm^{3+}$ | $6F_{9/2}$ | 1040~1070 |
| | $6H_{15/2}$ | 1400~1440 |
| | $6F_{3/2}$ | 1470~1520 |
| V | | 510~610, 910~1030, 1100~1290 |
| Cr | | 600~750 |
| $Cr^{3+}$ | | 570~630, 690~800 |
| Mn | | 330~390, 500~700 |
| Fe | | 500~720, 1670~2000 |
| $Fe^{2+}$ | | 650~1000, 1300~2000 |
| Co | | 320~400, 400~500, 700~770, 1000~1200, 1300~1600 |
| Ni | | 1100~1600 |
| $Ni^{2+}$ | | 420~520, 650~750 |
| Cu | | 250~320 |
| $Cu^{2+}$ | | 500~720 |
| Bi, Pb, Tl, W | | 400~1200 |
| Au, Cu nanoparticles | | 320~650 |
| Ag nanoparticles | | 300~550 |
| Si, Ge, Ti, Sn nanoparticles | | 500~1200 |
| CdS, CdSe, CdTe nanoparticles | | 410~880 |
| PbS, PbSe, PbTe nanoparticles | | 440~3100 |
| ZnS, ZnSe, ZnTe nanoparticles | | 300~540 |

Table 1 shows a preferred range which can be applied to interrogation. On the other hand, the wavelength range is not restricted to the shown ranges, and ultraviolet, visible, and infrared wavelength ranges can also be used for interrogation. Also, the wavelength range that can be used for interrogation can be adjusted by a predetermined amount according to a basic composition of the optical fiber material.

In the following, a method of manufacturing an interrogation optical fiber according to embodiments of the present invention will be described. By using the optical fiber manufacturing method in the following, it is possible to manufacture the interrogation optical fiber which has a constant light absorption characteristic and high reproducibility.

The interrogation optical fiber which is mainly made of glass can be manufactured by using a chemical vapor deposition process such as a modified chemical vapor deposition (MCVD) process, a vapor axial deposition (VAD) process, an outside vapor deposition (OVD) process, a plasma chemical vapor deposition (PCVD) process, a furnace chemical vapor deposition (FCVD) process. Also, the interrogation optical fiber can be manufactured by using a manufacturing method such as a solgel method, a double crucible method, a glass melting method, etc. In order to add the material for inducing the specific light absorption characteristic, a manufacturing method such as a solution doping method, an aerosol method, a heated frit, a heated source, a heated source injector, a chelate delivery, etc. can be used.

As for the interrogation optical fiber mainly made of a chalcogenide or fluride glass, it can be manufactured by using the double crucible method, the glass melting method, or the chemical vapor deposition process.

As for the interrogation optical fiber mainly made of a silica glass, it can be manufactured by using the chemical vapor deposition process such as a modified chemical vapor deposition (MCVD) process, a vapor axial deposition (VAD) process, an outside vapor deposition (OVD) process, a plasma chemical vapor deposition (PCVD) process, a furnace chemical vapor deposition (FCVD) process or the solgel method.

In particular, when the chemical vapor deposition process or the solgel method is used for manufacturing the silica optical fiber, it is possible to finely adjust the concentration of the material which is added to the interrogation optical fiber, and, therefore it is also possible to adjust the optical characteristic required for the measuring unit for the optical fiber sensor system more easily, which makes it possible to manufacture the interrogation optical fiber having very superb reproducibility.

The interrogation optical fiber which is mainly made of the polymer can be manufactured by using a polymerization method, an extrusion method, a chemical vapor deposition process, etc.

Figure 5:
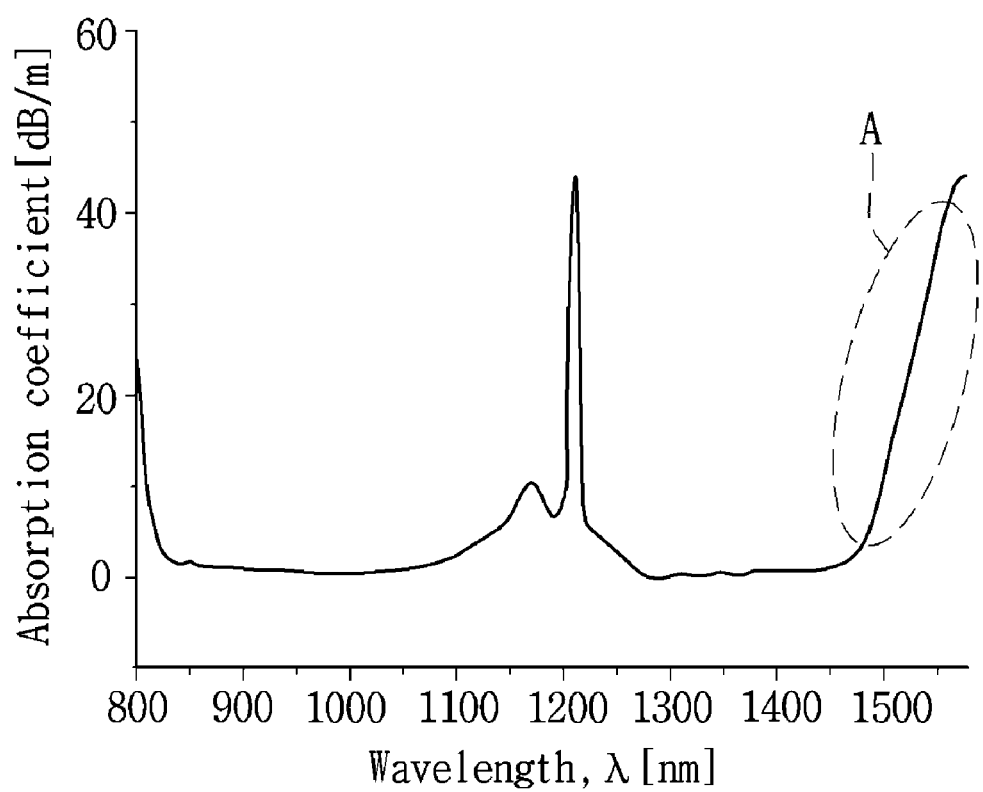
FIG. 5 is a diagram showing the light absorption characteristic of an interrogation optical fiber to which thulium ($Tm^{3+}$) is added according to an embodiment of the present invention.

FIG. 5 is a diagram showing the light absorption characteristic of the interrogation optical fiber to which thulium ($Tm^{3+}$) is added according to an embodiment of the present invention. First, the interrogation optical fiber used for this embodiment is manufactured by adding a material for inducing a specific light absorption characteristic along with a raw material gas during the optical fiber manufacturing process by using the modified chemical vapor deposition (MCVD) process.

To explain the method of manufacturing the optical fiber by using the MCVD process in more detail, the raw material gas such as $SiCl_4$, $GeCl_4$, $POCl_3$, $CF_4$, etc. is used to deposit a sintered cladding layer in a silica tube, and it is partially sintered such that a soot type core layer having fine pores is deposited. Then, the material for inducing the specific light absorption characteristic is dissolved in ethanol or water, etc. by using a solution doping method to generate a solution, and the material is allowed to be deposited on the core layer for a predetermined time interval and then removed. After the solution is removed, a predetermined amount of solution remains in the fine pores of the core layer, and the material which remains in the remaining solution is added to the core.

Finally, a drying process, a sintering process, and a collapsing process are performed to manufacture the optical fiber preform, and it undergoes an optical fiber drawing process to form the optical fiber. In the embodiment, hydrous 0.05 M TmCl3 and 0.3 M AlCl3 are dissolved in water, and the optical fiber to which thulium is added to the core thereof is manufactured by using a solution doping method.

Since it is possible to finely adjust the amount of ions in the optical fiber to which the rare earth element such as thulium is added, the optical characteristic to be measured in the measuring unit can be easily controlled, and it is possible to manufacture the interrogation optical fiber having the same characteristic. Therefore, this is a method with high process reproducibility.

As shown in FIG. 5, when referring to a graph showing the light absorption coefficient according to the wavelength of the interrogation optical fiber, which has been manufactured by adding thulium ($Tm^{3+}$), it can be acknowledged that there exists a range around the wavelengths of 800 nm and 1200 nm where large light absorption occurs, and a range around the wavelength of 1500-1563 nm where the light absorption characteristic of a very linear slope is observed as in the area A.

Figure 6:
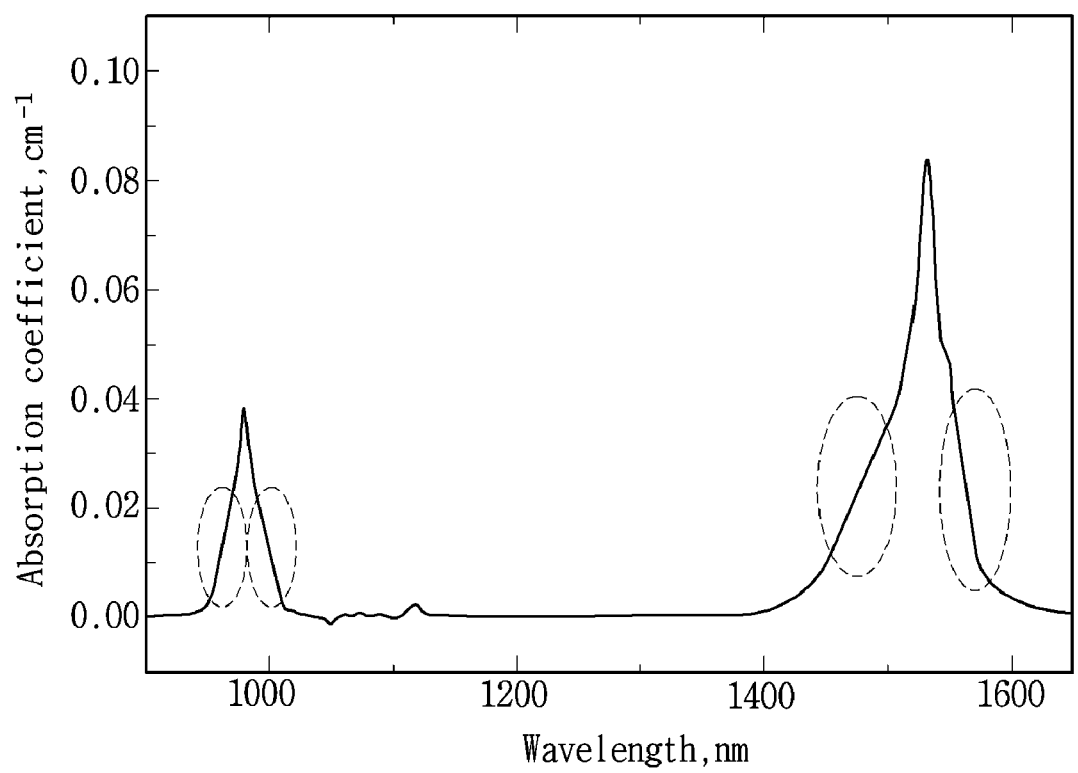
FIG. 6 is a diagram showing the light absorption characteristic of an interrogation optical fiber to which erbium ($Er^{3+}$) is added according to an embodiment of the present invention.

FIG. 6 is a diagram showing the light absorption characteristic according to the wavelength of the interrogation optical fiber to which erbium ($Er^{3+}$) is added according to another embodiment of the present invention. The optical fiber for interrogation used in the embodiment is manufactured by adding a material for inducing the light absorption characteristic during the optical fiber manufacturing process using the (MCVD) process. When referring to the graph, it can be known that there exists a range roughly around the ranges of 955-972 nm and 990-1008 nm where the linear light absorption characteristic according to the wavelength is observed, and, particularly, there exists a range in the ranges of 1453-1482 nm and 1550-1567 nm where the very linear light absorption characteristic according to the wavelength is observed. Therefore, these characteristics can be used for manufacturing the interrogation optical fiber for the optical fiber sensor system.

Figure 7:
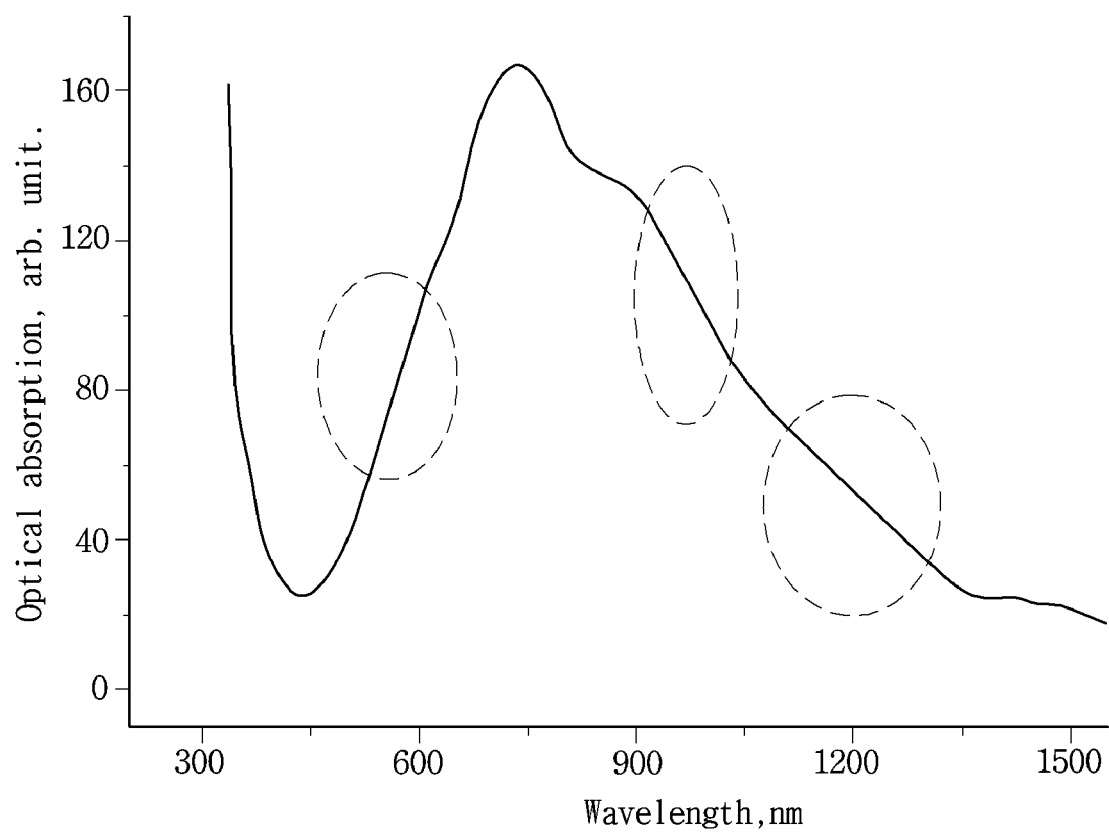
FIG. 7 is a diagram showing the light absorption characteristic of an interrogation optical fiber to which vanadium (V) is added according to an embodiment of the present invention.

FIG. 7 is a diagram showing the light absorption characteristic according to the wavelength of the interrogation optical fiber material to which vanadium (V) is added according to another embodiment of the present invention. The optical fiber material for interrogation used in the embodiment is manufactured by adding the material for inducing the light absorption characteristic during the optical fiber manufacturing process using a glass melting method and a molding method. The oxide glass, which mainly includes $SiO_2$, $P_2O_5$, and $V_2O_5$ as main components, is manufactured at a melting temperature of 1000-1500° C. by using the glass melting method. After the melting process, the molten glass is poured into a properly designed bar and tube-type mold core to manufacture the optical fiber preform having a core and a clad structure, and the result is heat-treated by heating for a predetermined time interval. Then, the mold is separated to manufacture the bar and tube type optical fiber preform, which undergoes a fiber drawing process to form an optical fiber with a diameter of 120-130 μm. In is important to prevent a decrease in the optical fiber strength and an increase in a loss due to crystallization during the drawing process, and the glass composition and a drawing temperature are properly adjusted to accomplish this. When referring to the graph, it can be known that there exists a range roughly around the range of 535-590 nm where the linear light absorption characteristic according to the wavelength is observed, and, particularly, there exists a range in the ranges of 910-1030 and 1100-1290 nm where the very linear light absorption characteristic according to the wavelength is observed. Therefore, these characteristics can be used for manufacturing the interrogation optical fiber for the optical fiber sensor system.

Figure 8A:
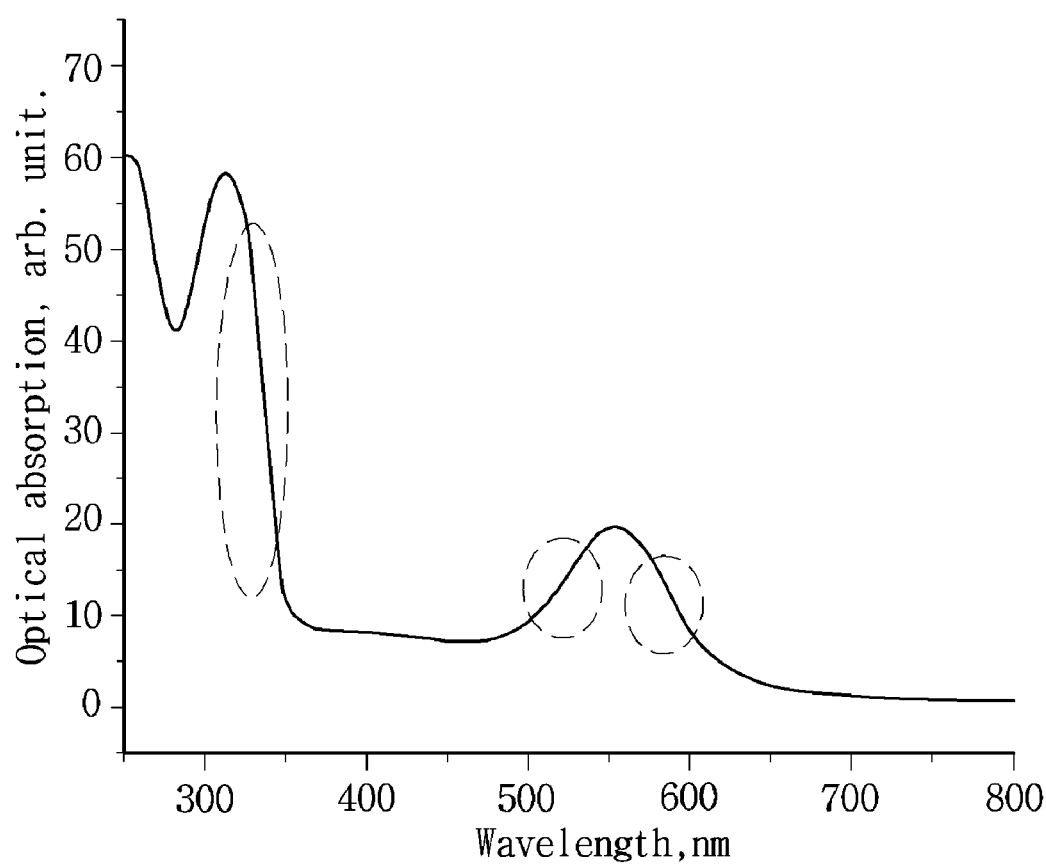
FIG. 8A is a diagram showing the light absorption characteristic of an interrogation optical fiber to which Au nanoparticles are added according to an embodiment of the present invention.
Figure 8B:
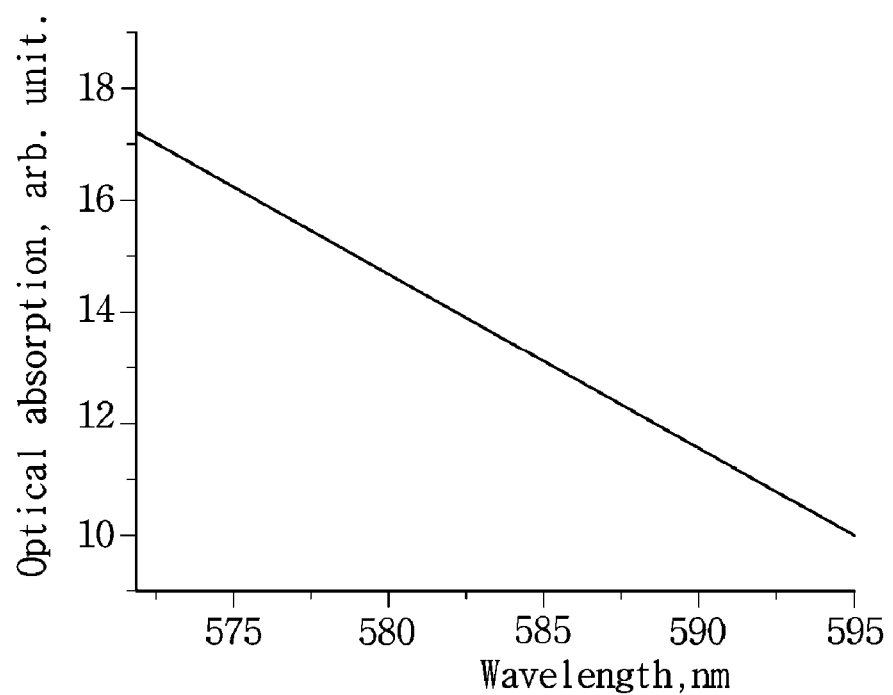
FIG. 8B is a diagram showing a linear light absorption characteristic around 570-590 nm of an interrogation optical fiber to which Au nanoparticles are added according to an embodiment of the present invention.

FIG. 8A is a diagram showing the light absorption characteristic according to the wavelength of the interrogation optical fiber to which Au nanoparticles are added according to another embodiment of the present invention, and FIG. 8B is a diagram which illustrates an expanded light absorption spectrum around a range of 570-595 nm which shows a very linear characteristic of the interrogation optical fiber in FIG. 8A to which the Au nanoparticles are added. The optical fiber material for interrogation used in the embodiment is manufactured by adding the material for inducing the light absorption characteristic during the optical fiber manufacturing process using the solgel method. As for the raw materials, $Si(OC_2H_5)_4$ or $Si(OCH_3)_4$, which is the raw material for host composition of a silica glass with a known composition, is used along with $C_2H_5OH$ and $HAuCl_4\cdot 4H_2O$ which is the raw material for the Au nano particles. A catalyzer for inducing glassification is used along with the raw materials, and the glass preform for the optical fiber has been manufactured by using a glassification process including a hydrolysis process and a polymerization process. Also, the glassification process is performed in a mold made of a plastic material such as teflon, etc. such that the bar and tube type glass preform for the optical fiber can be easily manufactured. In order to form the Au nanoparticles, a drawing temperature and a drawing speed are properly adjusted such that the nanoparticles are formed during the optical fiber drawing process, or the optical fiber is treated by heating after the optical fiber drawing process.

When referring to the graph in FIG. 8A, it can be acknowledged that the range showing the linear light absorption characteristic according to the wavelength exists in the ranges of about 325-340 nm, 510-535 nm, and 570-595 nm, and when referring to FIG. 8B, it can be also acknowledged that the optical fiber particularly has a very linear light absorption characteristic around 570-595 nm. This characteristic can be used for manufacturing the interrogation optical fiber for the optical fiber sensor system.

Figure 9:
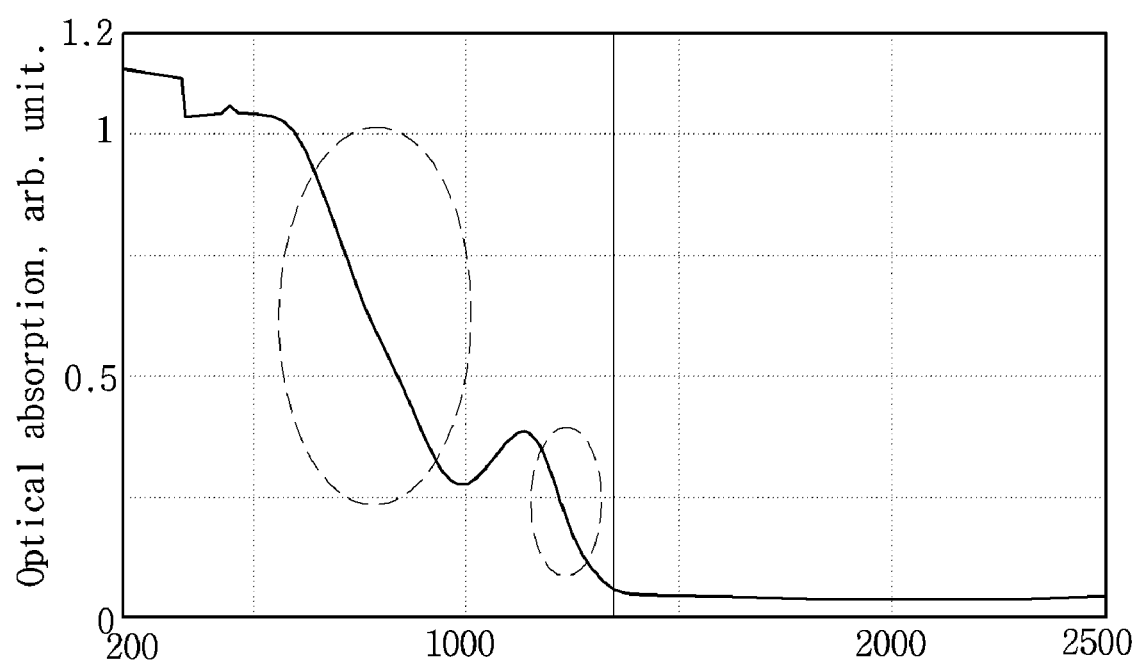
FIG. 9 is a diagram showing the light absorption characteristic of an interrogation optical fiber to which PbS nanoparticles are added according to an embodiment of the present invention.

FIG. 9 is a diagram showing the light absorption characteristic of an interrogation optical fiber to which PbS nanoparticles are added according to another embodiment of the present invention. The optical fiber material for interrogation used in the embodiment is manufactured by adding the material for inducing the light absorption characteristic during the optical fiber manufacturing process using a glass melting method and a molding method. Also, the interrogation optical fiber to which the PbS nanoparticles are added can be manufactured by using the chemical vapor deposition process and the solgel method. When referring to the graph, it can be known that there exists a range roughly around the a very wide wavelength ranges of 600-900 nm and 1150-1250 nm where the linear light absorption characteristic according to the wavelength is observed. Therefore, these characteristics can be used for manufacturing the interrogation optical fiber for the optical fiber sensor system.

In the following, the variation in intensity of the signal beam which passes through the interrogation optical fiber will be explained. The light intensity variation according to the wavelength of the signal beam can be acknowledged by calculating a ratio of light intensities, $R=10 \log(I/I_0)$, between the intensity I of the signal beam after passing through the interrogation optical fiber and the intensity $I_0$ before passing through the interrogation optical fiber.

Here, the intensity $I_0$ of the signal beam before passing through the interrogation optical fiber corresponds to the light intensity of the reference beam and is measured by the first detecting unit 33 while the light intensity I of the signal beam after passing through the interrogation optical fiber is measured by the second detecting unit 34.

Figure 10:
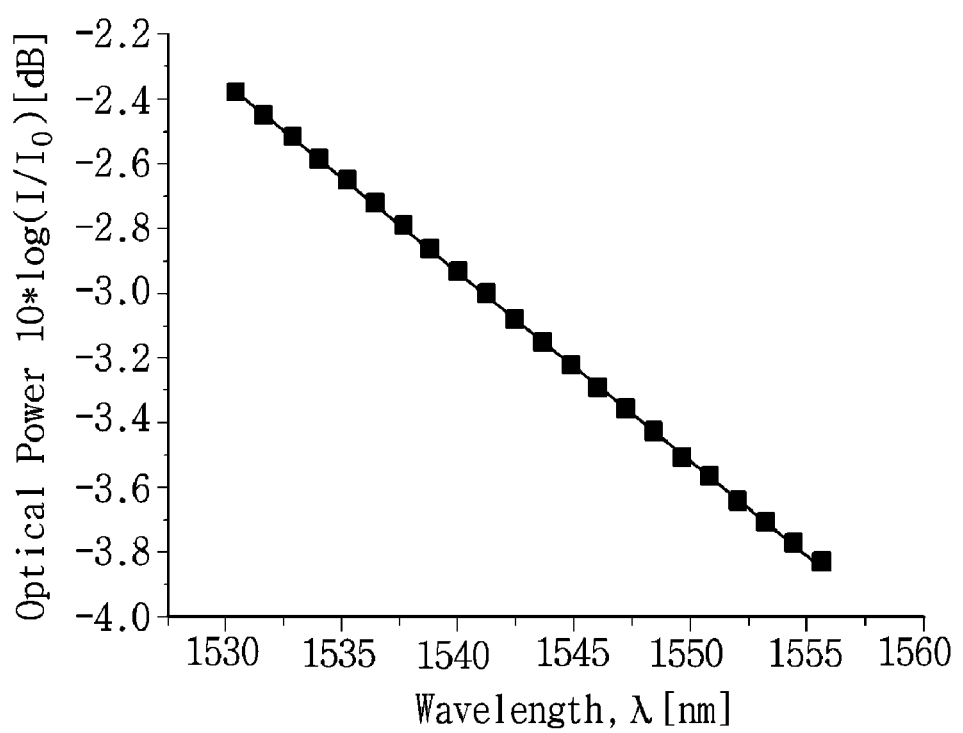
FIG. 10 is a diagram showing a light intensity variation according to the wavelength of a signal beam which has passed through the interrogation optical fiber at an area A in FIG. 2.

FIG. 10 is a diagram showing a light intensity variation of the signal beam, which has passed through the interrogation optical fiber, to which thulium ($Tm^{3+}$) is added, with a length of about 10 cm at an area A of FIG. 5, in some wavelength ranges higher than 1500 nm. That is, as shown in FIG. 5 in the above, the interrogation optical fiber to which thulium is added has a specific light absorption coefficient which linearly depends on different wavelengths in the corresponding range, and, therefore, it can be also acknowledged in FIG. 10 that the light intensity of the signal beam which has passed the optical fiber also varies linearly. FIG. 5 and FIG. 10 show that the range in which the linear light absorption coefficient with respect to the wavelength of the interrogation optical fiber can be obtained over the range of 25 nm-50 nm, and the embodiment shows that it is possible to detect the wavelength variation of the signal beam which moves over this range. In the following, a method of detecting the wavelength and of detecting the physical amount applied from outside from the detected wavelength by using the interrogation optical fiber will be explained in more detail.

In the embodiment using the interrogation optical fiber to which thulium is added as explained in FIG. 10, an analysis function, which shows a light intensity ratio R according to the wavelength $\lambda$, can be expressed in mathematical expression 1.

$$R=-5.84\times10^{-2}\times\lambda+86.9 \qquad (1)$$

Therefore, the wavelength $\lambda$ of the signal beam can estimated by using the mathematical expression 1 from the measured the light intensity ratio R. Also, a relational expression between the light intensity ratio R and the wavelength $\lambda$ can be reformed into mathematical expression 2.

$$R=a\times\lambda+b \qquad (2)$$

Here, a and b are coefficients which are determined by the light absorption characteristic according to the wavelength of the interrogation optical fiber.

And, when the wavelength $\lambda$ of the signal beam generated in the sensing unit is varied linearly by the physical amount M applied to the sensing unit from outside, a relation between the wavelength $\lambda$ and the physical amount M can be expressed in the following form.

$$\lambda=c\times M+d \qquad (3)$$

Here, c and d are coefficients which are characteristic coefficients determined by a sensitivity characteristic of the sensing unit element to which the physical amount is applied.

When combining mathematical expression 2 with mathematical expression 3, the following form can be obtained.

$$R=a\times(c\lambda M+b)+d=p\times M+q \qquad (4)$$

Here, the characteristic coefficient can be obtained by $p=a\times c$ and $q=a\times c+d$. Therefore, by using mathematical expression 4, the physical amount M can be finally derived from the measured light intensity ratio R.

Also, although the case in which the interrogation optical fiber and the sensing unit element have linear first order function characteristics, respectively, with respect to the variation in the wavelength of the signal beam and the physical amount has been explained, the same principle applies to the case of deriving the physical amount when they have other monotonously varying function such as a second order function, etc. That is, although forms of mathematical expression 2 and mathematical expression 3 can be partially altered according to different embodiments, a basic concept of measuring the wavelength $\lambda$ of the signal beam from the intensity of the signal beam, that is, the light intensity ratio R and then deriving the physical amount M from the wavelength is not changed. Here, other monotonously varying functions represent the function showing a monotonic function whose function value continuously increases or decreases within a partial or overall range such as an exponential function, a logarithmic function, and a polynomial function, and the functions can have similar characteristics to a first order function in some specified ranges.

It is preferred that the light absorption characteristic of the interrogation optical fiber monotonously varies in order to increase accuracy of signal analysis and to perform the analysis easily. More preferably, the signal analysis can be more accurate and easy when the light absorption characteristic of the interrogation optical fiber varies linearly. Here, the range in which the absorption characteristic is linear is preferably the linear range on a log scale or a linear scale. Therefore, although the embodiment analyzed in the log scale is used in FIG. 10, mathematical expression 2 and mathematical expression 3 can also be applied to a linear scale to perform the analysis. Also, in some cases, the wavelength range to be analyzed can be divided into a plurality of portions and analysis functions with monotonously varying function shapes can be used to analyze the respective portions in order to increase the accuracy of the signal analysis. Here, it is preferred that the respective divided wavelength ranges for analysis are analyzed by using analysis functions having first order functions.

Figure 18A:
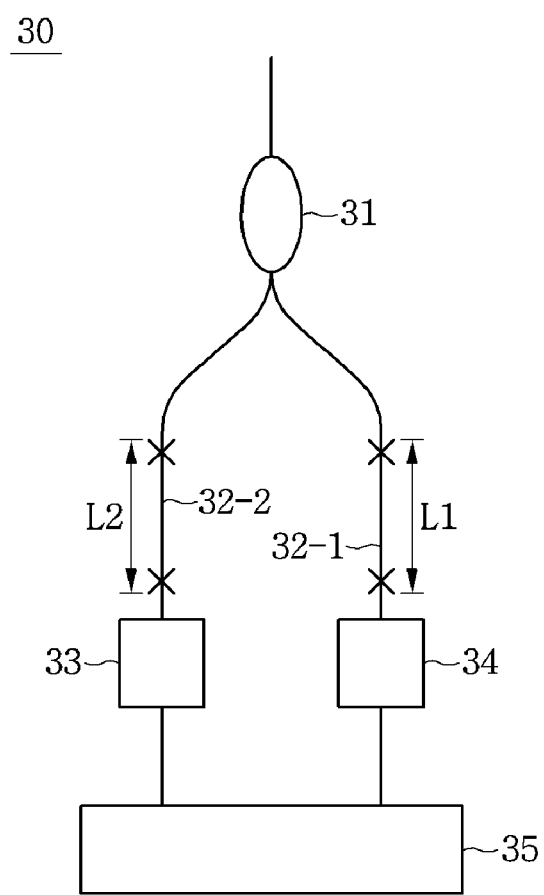
FIG. 18A is a diagram showing an optical characteristic measuring device according to an embodiment of the present invention.
Figure 18B:
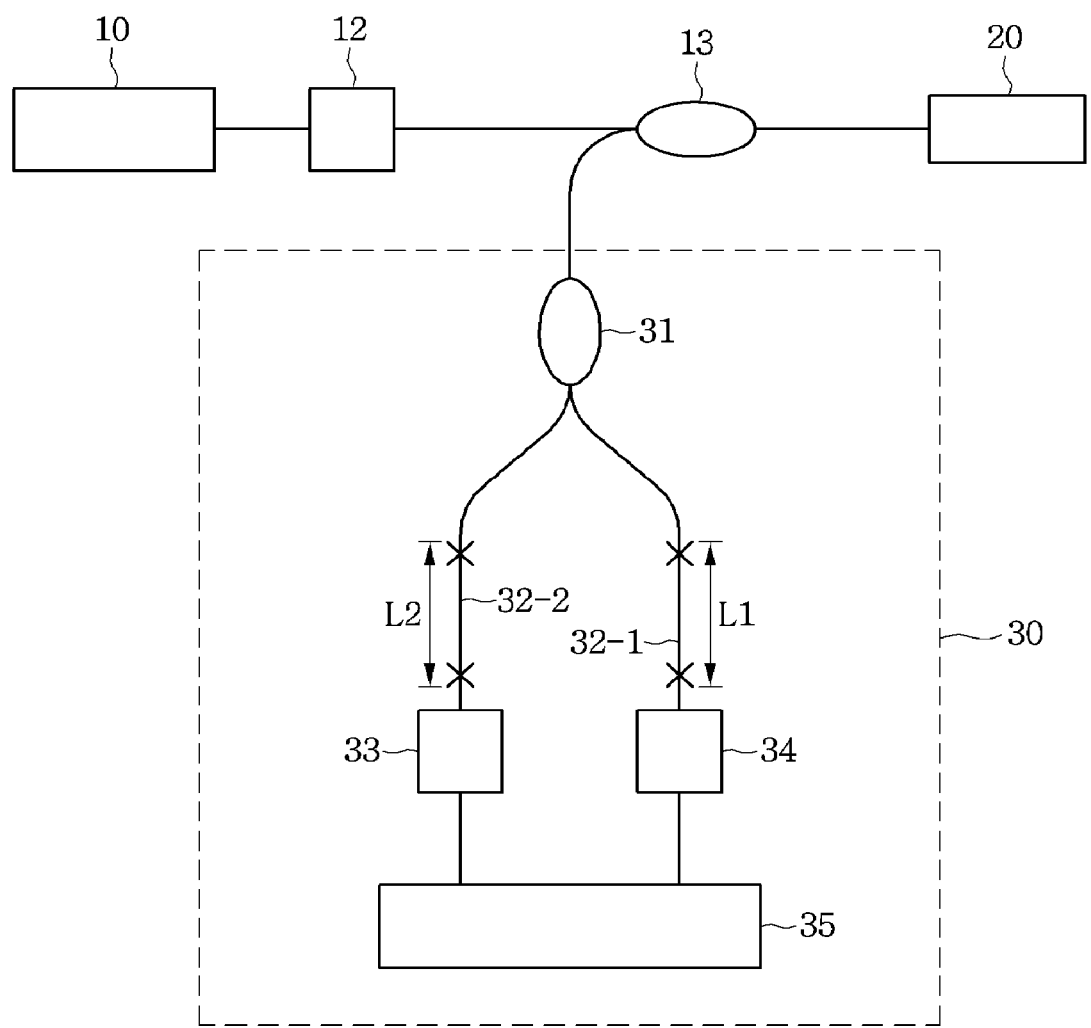
FIG. 18B is a diagram showing an optical fiber sensor system having an optical characteristic measuring device according to an embodiment of the present invention.

FIG. 18A and FIG. 18B are diagrams showing the optical characteristic measuring device for the optical fiber sensor system according to another embodiment of the present invention and the optical fiber sensor system using the same, respectively. When comparing the figures with the embodiments of FIG. 4A and FIG. 4B, respectively they are almost the same except that a first interrogation optical fiber 32-1 with a length L1 is arranged on the travel path of the signal beam, which is divided by the first optical coupler 31 and delivered to the second detecting unit 34, and a second interrogation optical fiber 32-2 with a length L2 is arranged on the travel path of the reference beam, which is divided by the first optical coupler 31 and delivered to the first detecting unit 33. The first and second interrogation optical fibers 32-1, 32-2 are characterized in being made of optical fibers with opposite light absorption slopes, and it is possible to improve the measuring sensitivity of the physical amount by crossing the light absorption slopes with each other in opposite manners. The detailed operation principle and the configuration of the embodiment will be explained in more detail by referring the following embodiments.

Figure 17:
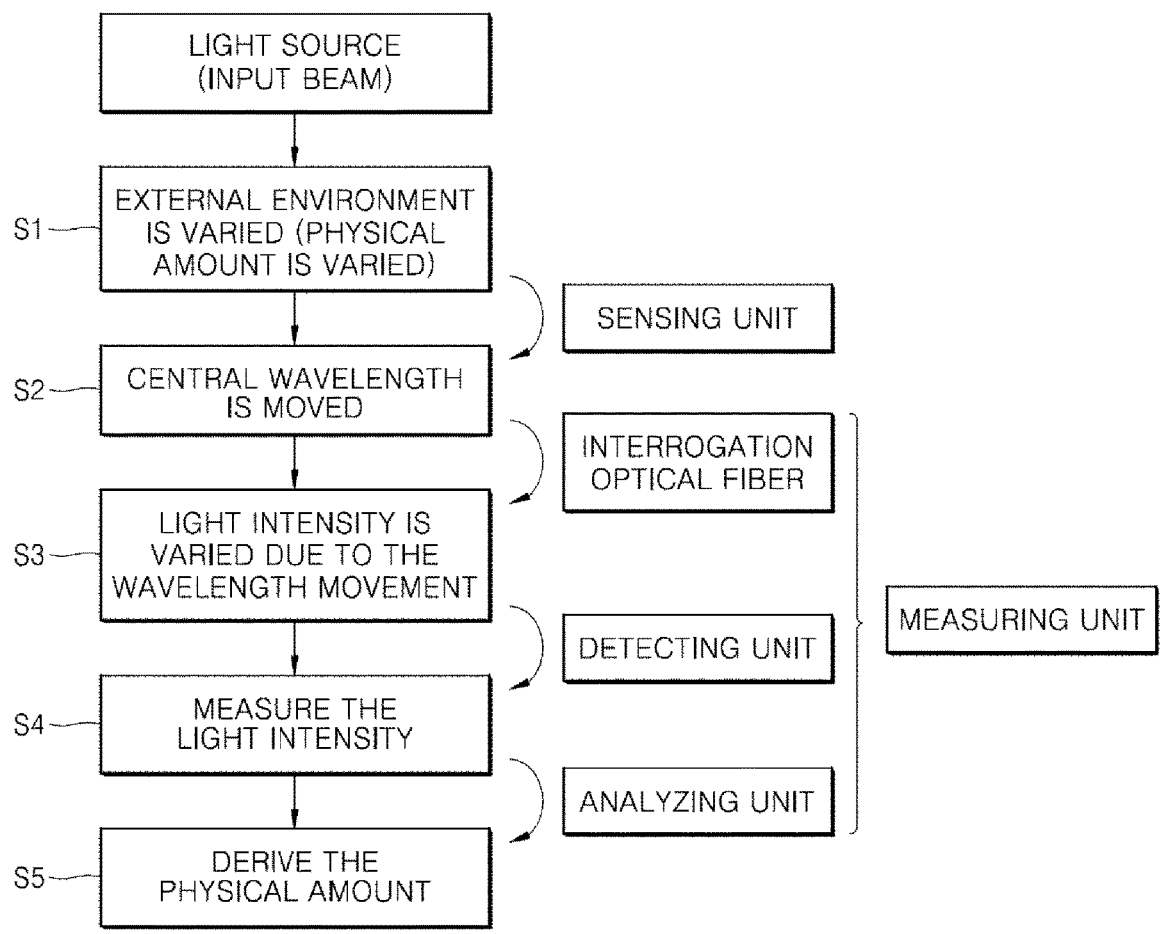
FIG. 17 is a flowchart showing a method of measuring a physical amount by using the optical fiber sensor system to which the interrogation optical fiber technology according to an embodiment of the present invention is applied.
Figure 19:
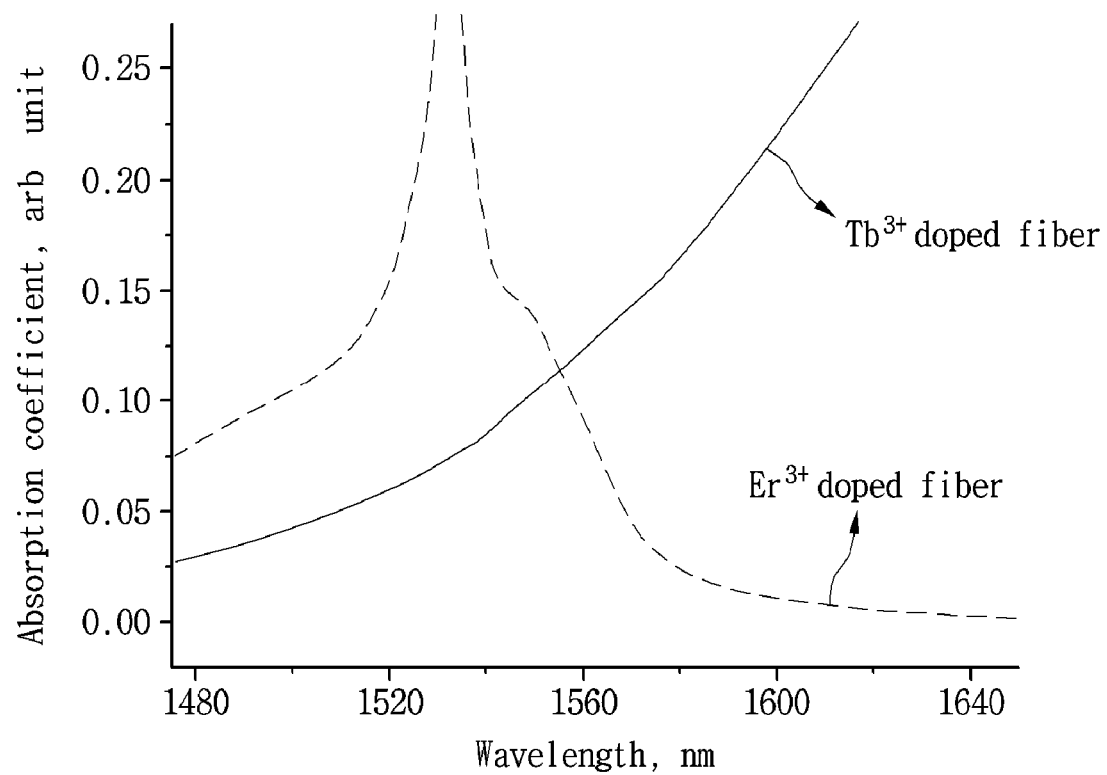
FIG. 19 is a diagram showing light absorption characteristic of interrogation optical fibers to which erbium ($Er^{3+}$) and terbium ($Tb^{3+}$) are added, respectively, according to an embodiment of the present invention.

FIG. 19 is a diagram which shows the compared light absorption characteristics of the interrogation optical fibers to which erbium ($Er^{3+}$) and terbium ($Tb^{3+}$) are added, respectively, in order to increase the measuring sensitivity by crossing the light absorption slopes in opposite manners according to the embodiment of the present invention. In the wavelength range of 1530-1700 nm, $Er^{3+}$ has a negative light absorption slope while $Tb^{3+}$ has a positive light absorption slope. Therefore, as an example, the embodiment of configuring the optical characteristic measuring device and the optical fiber sensor system by using the interrogation optical fibers, to which $Tb^{3+}$ and $Er^{3+}$ are added, respectively, on the travel path of the reference beam and the signal beam delivered to the first detecting unit 33 and the second detecting unit 34 in the configurations as shown in FIG. 18A and FIG. 17 can increase the measuring sensitivity by using the crossing characteristics of the slopes more than the embodiment of using only the interrogation optical fiber, to which $Er^{3+}$ is added, on the travel path of the signal beam which is delivered to the second detecting unit 34 in the configurations as shown in FIG. 4A and FIG. 4B. It would be apparent to a person with an ordinary skill in the related field that the identical improving effect can be obtained by changing the order of connected interrogation optical fibers such that the interrogation optical fibers, to which $Er^{3+}$ and $Tb^{3+}$ are added, respectively, are used on the travel path of the reference beam and the signal beam.

Table 2 shows the type and composition of major additive materials that can be added to the interrogation optical fiber in order to make improve the measuring sensitivity of the physical amount by crossing the light absorption slopes such that they are opposite to each other according to the embodiment of the invention, and major wavelength ranges for interrogation according to the additive materials.

TABLE 2

| wavelength range (nm) | additive material/ sign of light absorption slope | corresponding additive material/ sign of light absorption slope |
| --- | --- | --- |
| 1530~1600 | $Er^{3+}$/negative | $Tm^{2+}$ or $Tm^{3+}$/positive |
| 1530~1700 | $Er^{3+}$/negative | $Tb^{3+}$/positive |
| 955~1170 | $Yb^{3+}$/negative | $Tm^{2+}$ or $Tm^{3+}$/positive |
| 1300~1600 | Fe or $Fe^{2+}$/negative | Ni/positive |
| 1300~1600 | Fe or $Fe^{2+}$/negative | Co/positive |
| 1200~1600 | V/negative | Ni/positive |
| 1200~1600 | V/negative | Co/positive |

Figure 11:
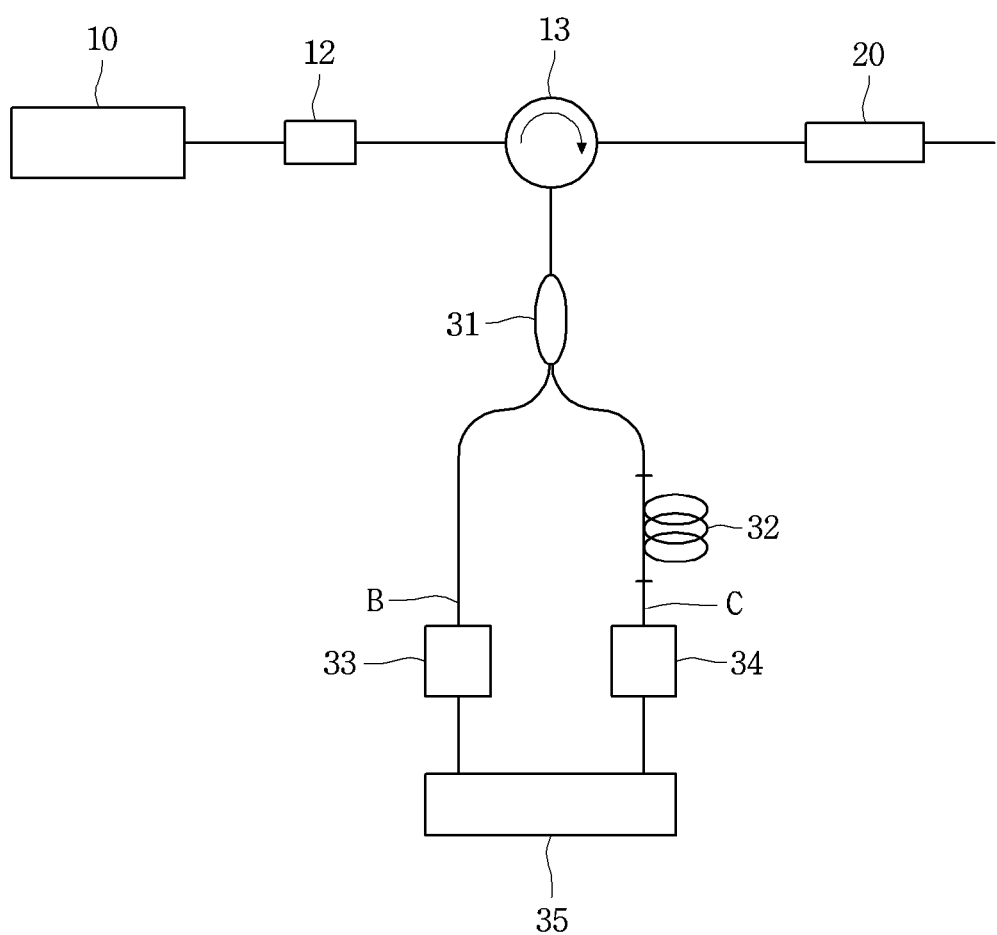
FIG. 11 schematically is a diagram showing an optical fiber sensor system which uses an FBG in a sensing unit and uses an interrogation optical fiber to which thulium is added in a measuring unit according to an embodiment of the present invention.
Figure 12A:
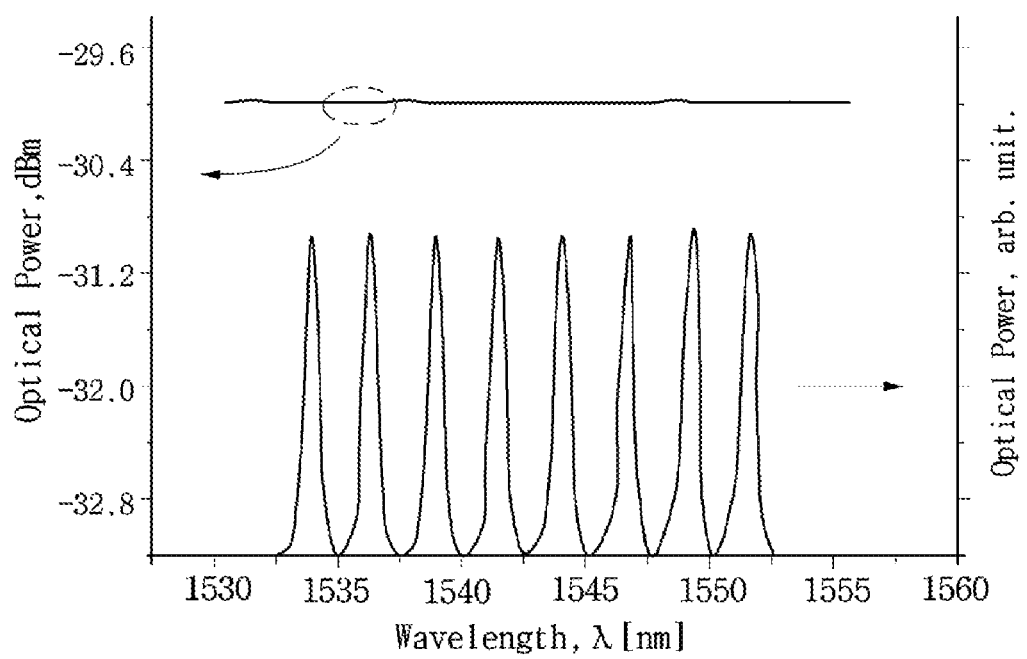
FIG. 12A is a graph showing a light intensity distribution according to a wavelength and a spectrum of a reference beam, which is applied at a point B in FIG. 11.
Figure 12B:
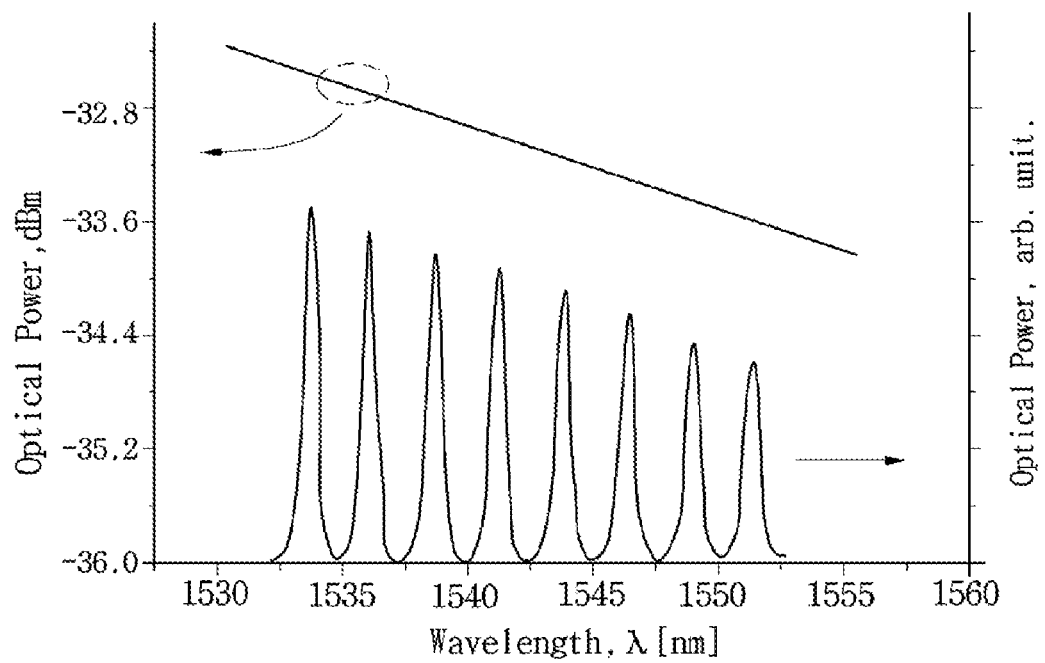
FIG. 12B is a graph showing a light intensity distribution according to a wavelength and a spectrum of a signal beam which is applied to a point C of FIG. 11 after being attenuated by the interrogation optical fiber.

FIG. 11 is a diagram which schematically shows the optical fiber sensor system using an optical fiber Bragg grating in the sensing unit and a circulator as the second optical coupler according to an embodiment of the present invention, FIG. 12A is a graph showing a light intensity distribution according to a wavelength and a spectrum of a reference beam, which is applied at a point B in FIG. 11, and FIG. 12B is a graph showing a light intensity distribution according to a wavelength and a spectrum of a signal beam which is applied to a point C of FIG. 11 and attenuated by the interrogation optical fiber.

In the embodiment in FIG. 11, a light source having a flat output intensity in the wavelength range of 1530-1560 nm, a second optical coupler 13 having a constant insertion loss in the above wavelength range, and a first optical coupler 31 having a constant coupling ratio of 50:50 in the wavelength range are used.

When referring to FIG. 11, the input beam outputted from the light source unit 10 is reflected from the optical fiber Bragg grating of the sensing unit 20 and divided into two optical output lines through the first optical coupler 31, and one of them propagates to the first detecting unit 33 while the other propagates to the second detecting unit 34 by way of the interrogation optical fiber 32.

When further referring to FIG. 12B, the resonance wavelength of the optical signal which is generated by reflection at the optical fiber Bragg grating is varied according to the variation of the external environment, and the optical spectrum of the signal beam, which is attenuated after passing through the interrogation optical fiber having the same optical characteristic shown in FIG. 10, is represented with the light intensity slope graph measured in the second detecting unit 34. That is, since the optical attenuation amount of the interrogation optical fiber varies linearly according to the wavelength, the light intensity, which is measured by the second detecting unit 34, can also vary linearly. On the other hand, as for the reference beam propagating to the first detecting unit, it does not pass through the interrogation optical fiber 32 and, therefore, does not undergo the optical attenuation. As a result, when a common noise or an error is removed, the constant light intensity which does not depend on the wavelength can be measured as shown in FIG. 12A.

When comparing the light intensity of the reference beam measured in the first detecting unit as in the above with the light intensity of the attenuated signal beam which is measured in the second detecting unit, the wavelength of the signal beam can be derived. Therefore, the varied wavelength of the signal beam, which has been generated in the sensing unit, can be derived by measuring and comparing the intensities of the delivered beams with each other with the first detecting unit 33 and the second detecting unit 34, and finally the varied physical amount can be derived by using the compared result.

FIGS. 13-16 are schematic illustrations of an optical fiber sensor system according to another embodiment of the present invention. When comparing them with FIG. 11, the optical fiber sensor system explained in FIG. 13 has a configuration in which no first optical coupler is provided and the first detecting unit 33 and the interrogation optical fiber 32 are directly connected with the second optical coupler 13. The rest of the optical fiber sensor system configurations and the measuring method are the same as in FIG. 11. That is, the embodiment in FIG. 11 divides the optical signal generated in the sensing unit 20 in two pieces by using the first optical coupler 31 and uses a portion of them as the reference beam; however, the embodiment in FIG. 13 a portion of the input beam, which is delivered from the light source unit 10, is directly received as the reference beam by the second optical coupler 13, and the light intensity is measured at the first detecting unit 33. A light attenuator 36 having a characteristic, which does not depend on the wavelength, can be arranged before the first detecting unit 33 in order to attenuate the intensity of the reference beam. In this case, since the first optical coupler is not used, the system configuration can be simplified and the manufacturing cost can be decreased. The configuration of the measuring unit using other interrogation optical fibers 32, and a method of measuring and analyzing the optical signal are identical to those in the embodiment explained by referring to FIG. 11.

Figure 14:
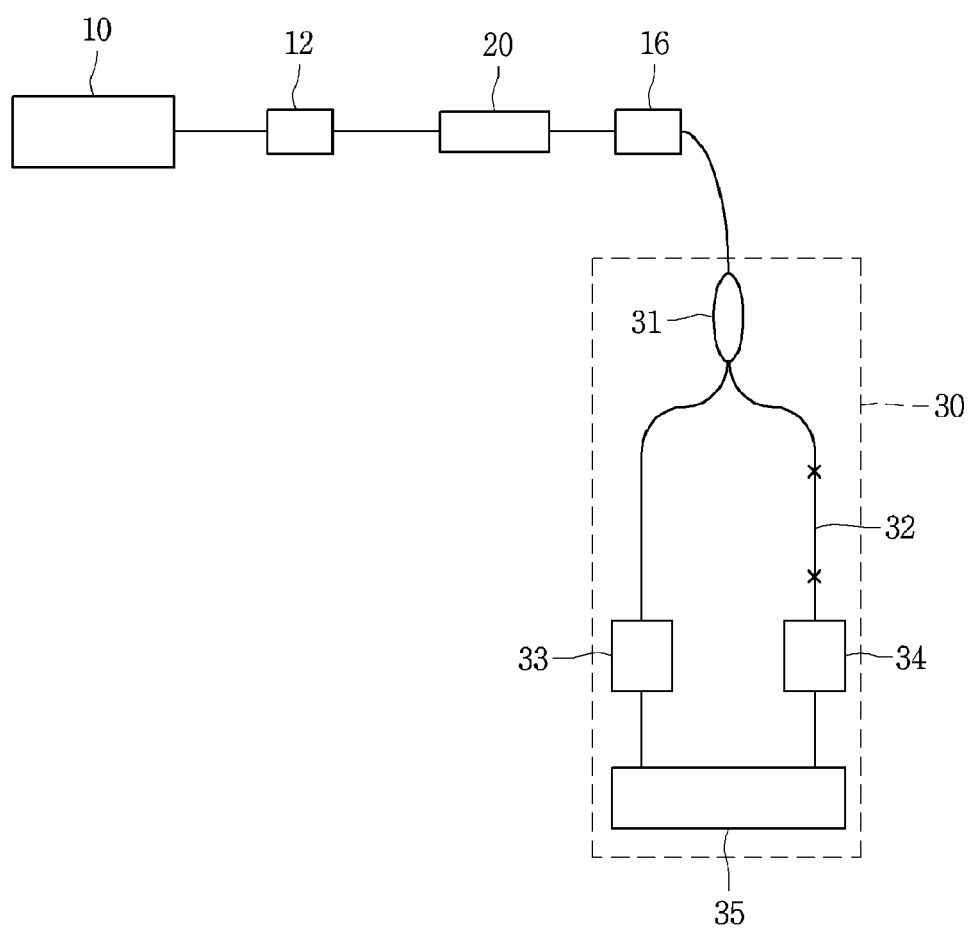
FIG. 14 is a schematic illustration of an optical fiber sensor system according to another embodiment of the present invention.

FIG. 14 is a schematic illustration of an optical fiber sensor system according to another embodiment of the present invention. When comparing FIG. 14 with FIG. 11, in the embodiment shown in FIG. 14, the input beam outputted from the light source unit 10 is directly delivered to the sensing unit 20 without using the second optical coupler 13. Then, the optical signal generated in the sensing unit 20 is divided into two pieces by the first optical coupler 31, a portion of them is used as the reference beam such that the light intensity is measured by the first detecting unit 33, while the rest is used as the signal beam and passes through the interrogation optical fiber 32 to be measured by the second detecting unit 34. The configuration of the measuring unit 30 for measuring and analyzing the optical signal generated in the sensing unit 20 by using the interrogation optical fiber 32 as well as the method thereof are identical to the embodiment explained by referring to FIG. 11.

In the sensing unit 20 which was explained by referring to FIG. 11, an optical signal, which propagates in a direction opposite to the propagation direction of the input beam outputted from the light source unit 10, is generated, and the optical element proper for this sensing unit can include an optical fiber Bragg grating (FBG) and a stimulated brilliouin scattering (SBS)-based optical element. On the other hand, the sensing unit 20 explained in FIG. 14 generates the optical signal in the same direction as the propagation direction of the input beam, and the optical element proper for this sensing unit can include a long period fiber gating (LPFG), a Fabry-Perot filter, and an optical element using a Raman scattering process, an anti-stokes Raman scattering (CARS) process, an optical parametric generation process, a sum frequency generation (DFG: SHG, THG) process, a difference frequency generation (FWM) process, etc. When necessary, an optical isolator 12 and a band pass filter 16 which only passes the optical signal generated in the sensing unit can be arranged around the sensing unit 20 as shown in FIG. 14.

Figure 15:
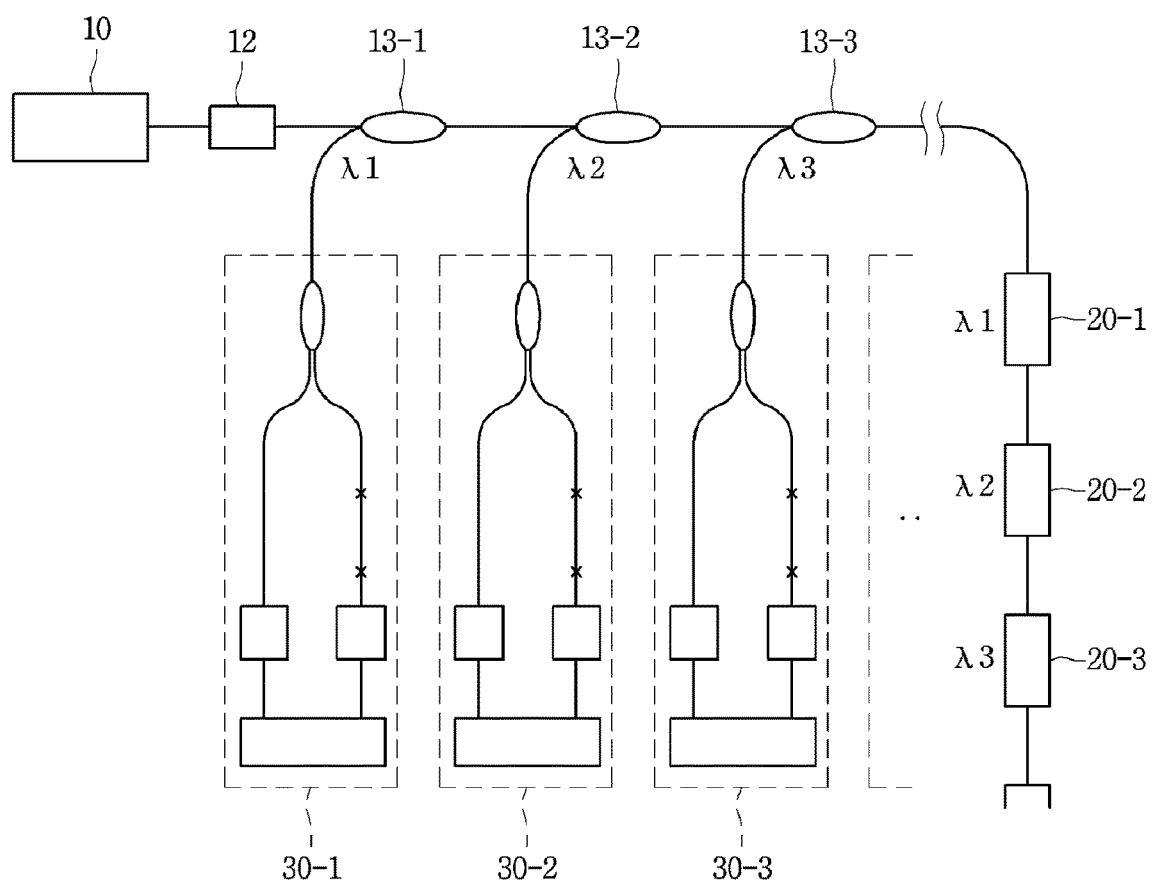
FIG. 15 is a schematic illustration of an optical fiber sensor system according to another embodiment of the present invention.

FIG. 15 is a schematic illustration of an optical fiber sensor system according to another embodiment of the present invention. Since the optical fiber sensor system has a plurality of sensing unit 20-1, 20-2, 20-3, ... operating in different wavelengths, the sensor system can be used for WDM measurement and for a distributed sensor system field using the same. The sensor system shown in FIG. 15 consists of groups of the sensing units 20-1, 20-2, 20-3, ..., second optical couplers 13-1, 13-2, 13-3, ..., and measuring units 30-1, 30-2, 30-3, ... which operate in different wavelengths l1, l2, l3, ..., respectively. In more detail, the input beam generated in the light source unit 10 is delivered to the sensing units 20-1, 20-2, 20-3, ... by way of the second optical couplers 13-1, 13-2, 13-3, ..., and the sensing units generate optical signals which are affected by the external environment at different resonance wavelengths l1, l2, l3, .... Also, each of the first optical couplers delivers only the optical signal generated in the corresponding sensing unit, and detects and analyzes the optical signal. Since a plurality of wavelengths are used for measuring, the characteristic of the light source unit 10 used in the sensor system of FIG. 15 preferably has an optical band width wide enough to encompass all of the wavelengths l1, l2, l3, .... The optical fiber sensor system shown in FIG. 15 is made by combining a plurality of individual optical fiber sensor systems shown in FIG. 11 with one another and this enable the sensor system to perform the multiplexing measurement. The configuration of the basic measuring unit for measuring and analyzing the optical signal generated in the respective sensing units by using interrogation optical fibers as well as the method thereof are identical to the embodiment explained by referring to FIG. 11.

Figure 16:
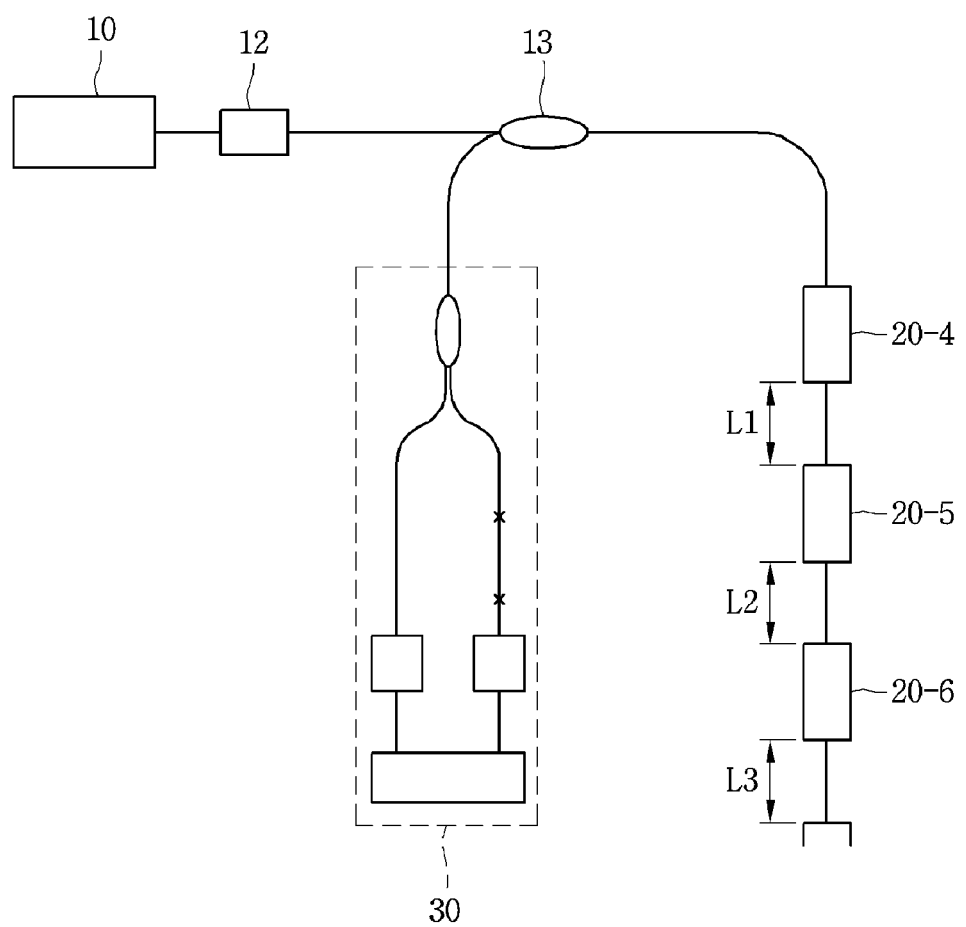
FIG. 16 is a schematic illustration of an optical fiber sensor system according to another embodiment of the present invention.

FIG. 16 is a schematic illustration of an optical fiber sensor system according to another embodiment of the present invention. Since the optical fiber sensor system include a plurality of sensing units 20-4, 20-5, 20-6, ... which are arranged with specified distances L1, L2, L3, ... from each other, the sensor system can be used for TDM measurement and for a distributed sensing system field using the same. Since the optical signals generated from the respective sensing units travel along optical paths with different length before they reach the measuring unit 30 to be detected, they are measured at different time intervals, and, it is possible to discriminate and measure the physical amounts detected in the respective sensing units by using the system.

In order to accomplish this, the light source unit 10 of FIG. 16 is preferably a light source which is operated at a pulse-shape waveform, and the sensing units 33, 34 are configured to measure the optical signals outputted from the light source unit. The optical fiber sensor system shown in FIG. 16 is made by combining a plurality of sensing units of the individual optical fiber sensor systems shown in FIG. 11 with one another. The configuration of the basic measuring unit for measuring and analyzing the optical signal generated in the respective sensing units by using interrogation optical fibers as well as the method thereof are identical to the embodiment explained by referring to FIG. 11.

Figure 20:
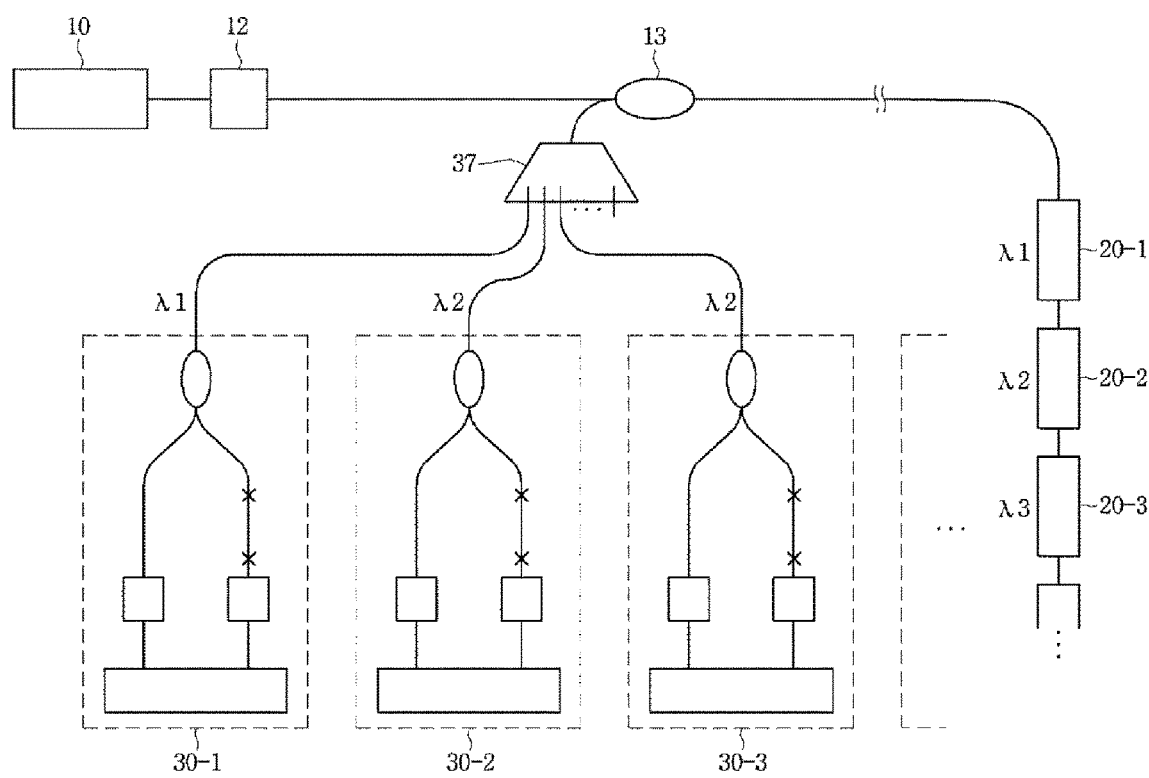
FIG. 20 is a schematic illustration of an optical fiber sensor system according to another embodiment of the present invention.

FIG. 20 is a schematic illustration of an optical fiber sensor system according to another embodiment of the present invention. Similarly to the sensor system shown in FIG. 15, since the optical fiber sensor system has a plurality of sensing unit 20-1, 20-2, 20-3, . . . operating in different wavelengths, the sensor system can be used for WDM measurement and for a distributed sensor system field using the same. The sensor system consists of groups of the sensing units 20-1, 20-2, 20-3, . . . and measuring units 30-1, 30-2, 30-3, . . . which operate in different wavelengths l1, l2, l3, . . . , respectively.

What is different from the sensor system shown in FIG. 15 is that the second optical coupler 13 and a wavelength dividing element 37 are used instead of multiple second optical couplers in order to divide the signal beam generated in the sensing unit. An arrayed waveguide grating (AWG), a planar Echelle grating, a spatial heterodyne spectrometer, etc. can be used as the wavelength dividing element 37. In more detail, the input beam generated in the light source unit 10 is delivered to the sensing units 20-1, 20-2, 20-3, . . . by way of the second optical couplers 13, and the sensing units generate optical signals which are affected by the external environment at different resonance wavelengths l1, l2, l3, . . . .

Then, the optical signals generated by the multiple sensing units by using the wavelength dividing element 37 are delivered to corresponding measuring units 30-1, 30-2, 30-3, . . . according to the wavelength, and the measuring units 30-1, 30-2, 30-3, . . . detect and analyze the optical signals. The sensor system as shown in FIG. 20 also has the advantage that it can be miniaturized when compared with the sensor system shown in FIG. 15. As for the optical fiber sensor system according to the wavelength division multiplexing as shown in FIG. 20, in the same manner as shown in FIG. 15, the configuration of the basic measuring unit for measuring and analyzing the optical signal generated in the respective sensing units by using the interrogation optical fiber as well as the method thereof are identical to the embodiment explained by referring to FIG. 11.

Figure 21:
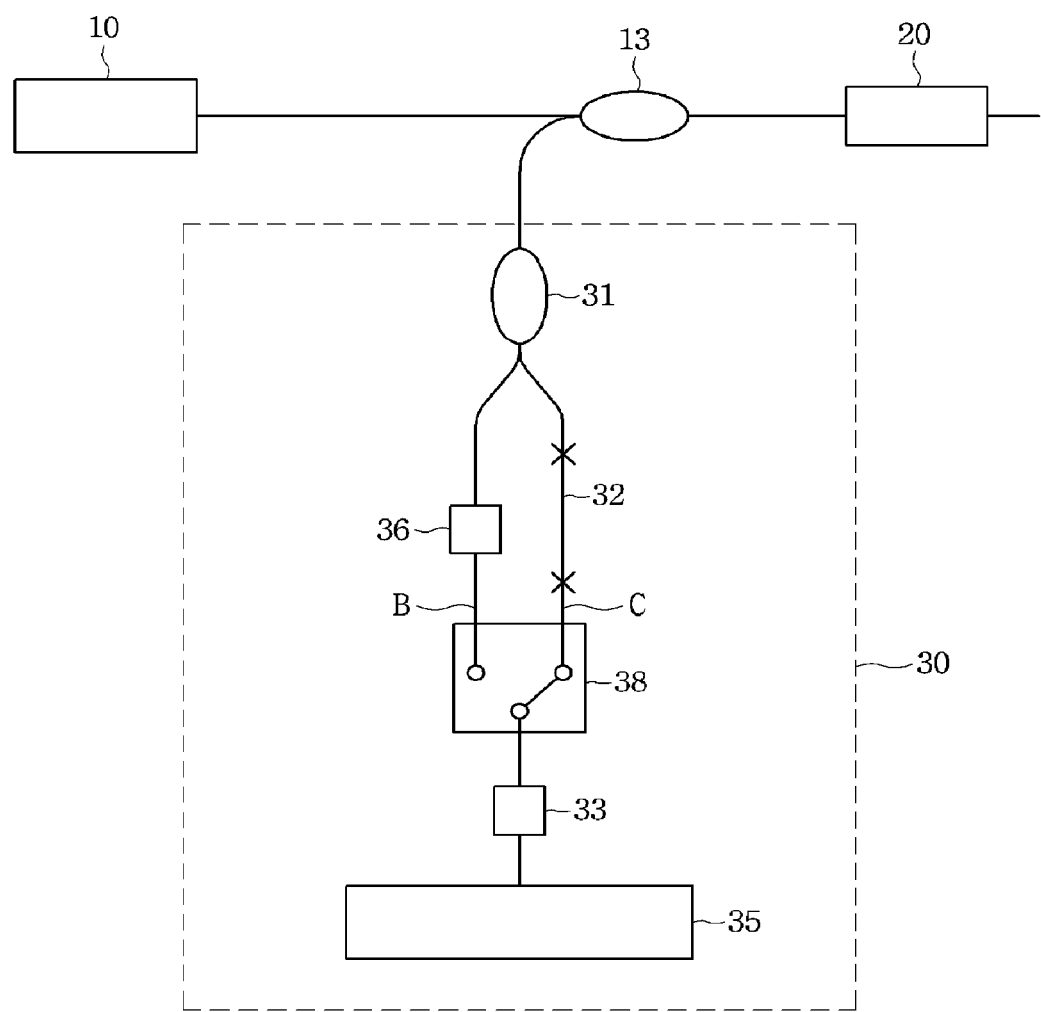
FIG. 21 is a schematic illustration of an optical fiber sensor system according to another embodiment of the present invention.

When explaining by comparing the embodiment with the embodiment disclosed in FIG. 11, the optical fiber sensor system described by referring to FIG. 21 is different from the embodiment shown in FIG. 11 in that one detecting unit 33, instead of two sensing units 33, 34, and a light switch 38 are provided, and the rest system structure and the physical amount measuring method are similar to the case shown in FIG. 11. The signal beam, which is generated by the sensing unit 20 after receiving the input beam from the light source unit 10, passes through the second optical coupler 13 and the first optical coupler 31 to reach point B and point C, respectively, as the reference beam and the attenuated signal beam.

Figure 13:
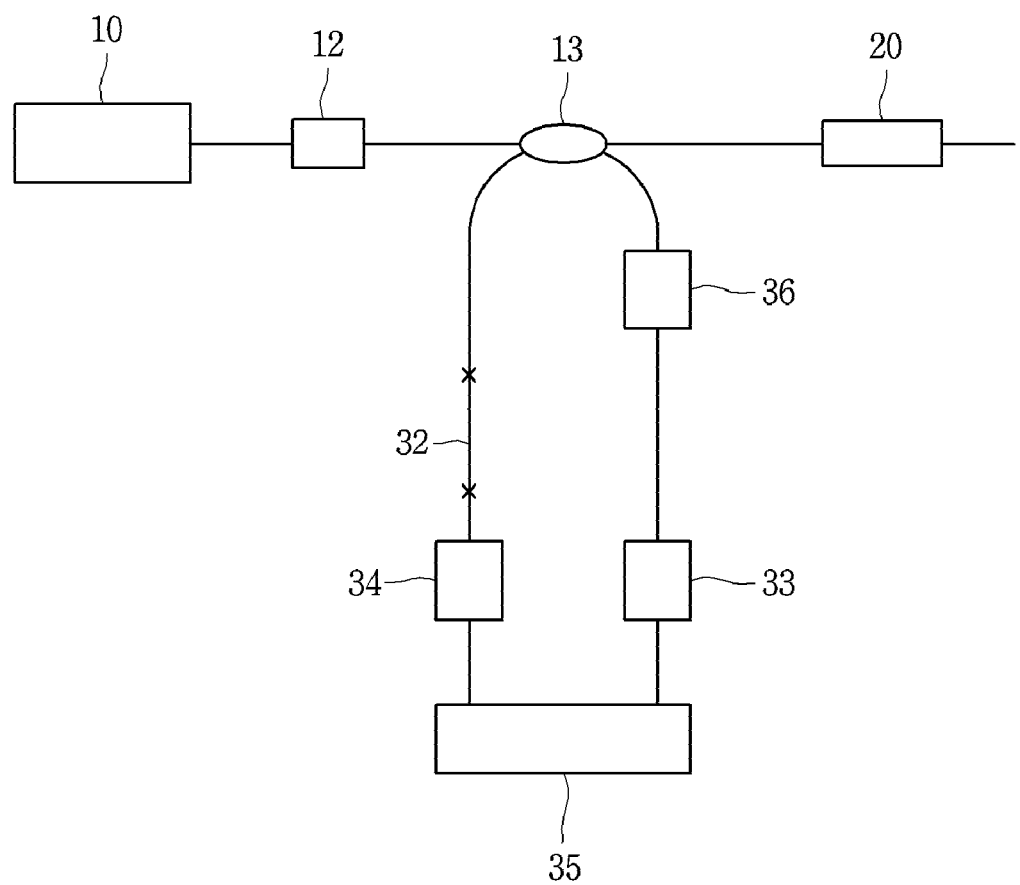
FIG. 13 is a schematic illustration of an optical fiber sensor system according to another embodiment of the present invention.

Then, the light intensities of the reference beam and the attenuated signal beam are measured at a predetermined time period by the light switch 38, and the analyzing unit 35 compares the intensities of the reference beam and the attenuated signal beam, which were measured at a predetermined period, with each other to calculate the physical amount. When necessary, a light attenuator 36 can be arranged on the optical path from the second optical coupler to the detecting unit 33 in order to attenuate the intensities of the reference beam or the signal beam as shown in FIG. 4B and FIG. 13. By using the method explained by referring to FIG. 21, it is possible to greatly reduce the number of optical couplers and the detecting units, which are needed due to the wavelength division multiplexing in FIG. 15 and FIG. 20, and the cost for configuring the sensor system can be reduced.

Figure 22:
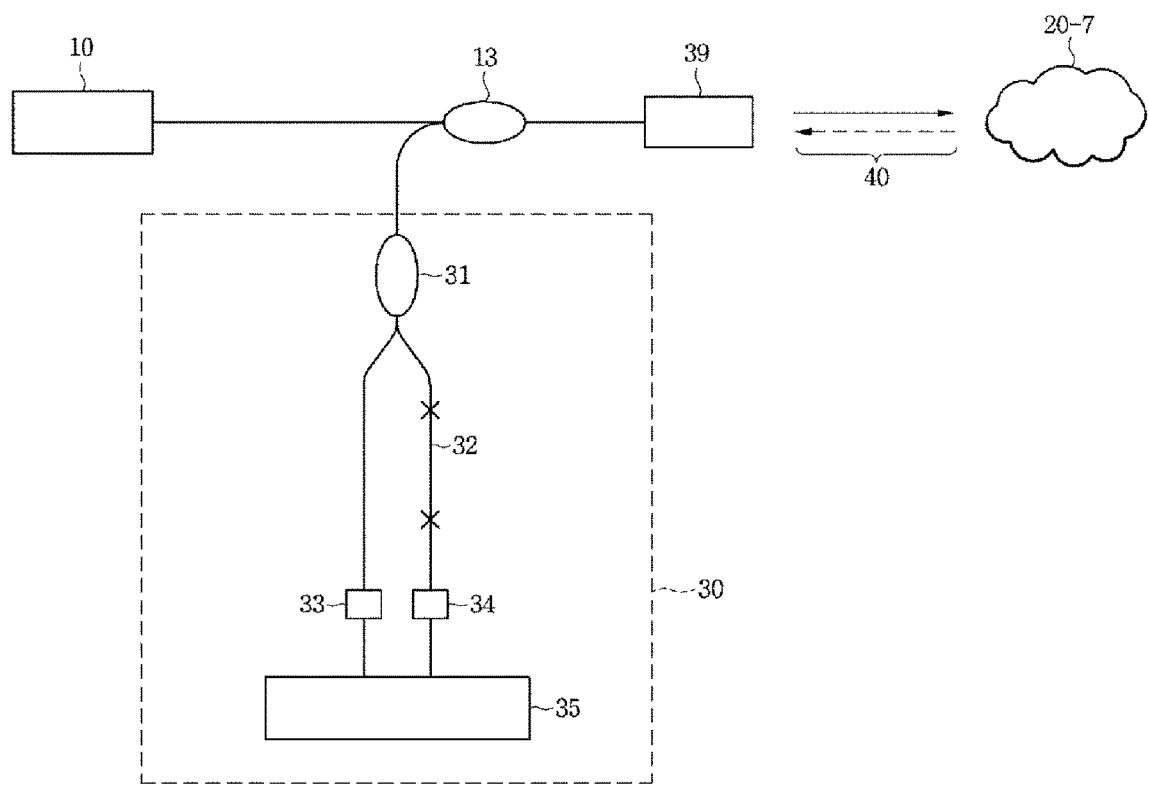
FIG. 22 is a schematic illustration of an optical fiber sensor system according to another embodiment of the present invention.

FIG. 22 is a schematic illustration of an optical fiber sensor system according to a still another embodiment of the present invention. When comparing with FIG. 4B and FIG. 11, in the embodiment shown in FIG. 22, a sensing unit 20-7 for generating the signal beam is not physically connected with the second optical coupler 13 via an optical fiber, and rather, the sensing unit and the second optical coupler are formed to be apart from each other by a free space with a predetermined spacing which is filled with gas or liquid.

In more detail, in the sensor system shown in FIG. 22, the input beam outputted from the light source unit 10 passes through the second optical coupler 13 and travels toward the sensing unit 20-7 via an optical element for transmission and reception 39 which is connected with the second optical coupler. Then, the input beam passes through the free space 40 with the predetermined spacing to reach the sensing unit 20-7, where the signal beam is generated. The generated signal beam passes through the free space 40 again and reaches the second optical coupler via the optical element for transmission and reception 39. The signal beam generated in the sensing unit is divided into two pieces by the first optical coupler 31, a portion of them is used as the reference beam such that the light intensity is measured by the first detecting unit 33, while the rest is used as the signal beam and passes through the interrogation optical fiber 32 to be measured by the second detecting unit 34.

The configuration of the measuring unit 30 for measuring and analyzing the optical signal generated in the sensing unit 20-7 by using the interrogation optical fiber 32 as well as the method thereof are identical to the embodiment explained by referring to FIG. 4B and FIG. 11. Also, in order to obtain the reference beam, the sensor system configuration explained by referring to FIG. 13 can be used instead of the configurations shown in FIG. 4B and FIG. 11. The optical element for transmission and reception 39 shown in FIG. 22 can serve both the function of an output unit, which delivers the input beam toward the sensing unit 20-7, and the function of an input unit, which receives the signal beam generated in the sensing unit 20-7 and delivers the signal beam toward the second optical coupler 13, and it can include a single optical lens or a plurality of optical lenses. Also, the optical element for transmission and reception 39 can be an optical fiber type collimator which includes a GRIN lens or a thermally expanded core (TEC) optical fiber element, etc. In addition, the optical element for transmission and reception 39 can have the function of expanding the diameter of the outputted input beam in order to improve the optical output and a light receiving efficiency.

Also, when the sensing unit 20-7 is bulky, the optical element for transmission and reception 39 can have a scan function for changing a direction of the input beam which propagates toward the sensing unit 20-7. In addition, an optical isolator 12 for protecting the light source unit 10 as shown in FIG. 11 and a band pass filter 16 for only passing the optical signal generated in the sensing unit as shown in FIG. 14 can be used on the optical path. The signal beam generated in the sensing unit 20-7 can be an optical signal according to the Rayleigh scattering, the Mie scattering, the Raman scattering, the Brilliouin scattering, and the Doppler effect, etc. The sensing unit 20-7 can be a fluidic material such as air or the ocean. Since the optical characteristic such as the central wavelength of the signal beam can be varied according to the characteristics of a fine material such as the yellow dust, the fine dust, the aerosol, and planktons distributed in this fluidic material, and the variation in the characteristic of the signal beam can be measured by using the optical fiber sensor system, it is possible to analyze the variation in the characteristic of the sensing unit 20-7, for example a flow of the air or the ocean, and a distribution characteristic of the fine materials in the fluidic materials.

As a still another embodiment, it is possible to configure the optical fiber sensor system by combining the optical fiber sensor system structure explained by referring to FIGS. 4A, 4B, 11, 13, 14, 16, 18A, 18B, 19, and 21, the wavelength division multiplexing structure explained by referring to FIGS. 15 and 20, and the time division multiplexing structure explained by referring to FIG. 16 with one another.

That is, the optical characteristic measuring device and the optical fiber sensor system using the same according to the embodiments of the present invention are characterized in that they are configured by simply using interrogation optical fibers with each other, they do not need optical alignment process for internal components, and the measuring unit are not affected by the external environment such as a vibration, a pressure, a temperature, etc. Also, the configuration of them is structurally simple and easy to manufacture, which greatly decreases the manufacturing cost. The optical fiber sensor system according to the present invention uses the basic measuring structure and principle explained with respect to the embodiments in the above, and, it can be manufactured in various configurations other than the configurations explained with respect to the aforementioned embodiments.

FIG. 17 is a flowchart showing a method of measuring the optical characteristic by using the optical fiber sensor systems according to various embodiments of the present invention. The optical characteristic measuring method according to an embodiment of the present invention will be explained by referring to FIG. 17.

At first, the light source unit outputs the input beam having a predetermined wavelength to the sensing unit. The sensing unit can be manufactured using various optical elements including the optical fiber Bragg grating, and the signal beam (optical signal) can be generated from the input beam which is delivered from the light source unit by the optical element in the sensing unit. Then, the sensing unit is affected by a variation in the external environment, that is, the variation in the physical amount applied to the sensing unit (S1), and then the central wavelength of the signal beam generated in the sensing unit is moved (S2).

In order to measure the wavelength of the signal beam which has been moved by the physical amount applied to the sensing unit, a portion of the signal beam is delivered to the interrogation optical fiber which is an optical fiber for the measuring unit. Since the light absorption characteristic of the interrogation optical fiber is linear as the wavelength varies, the light intensity is varied according to the wavelength of the signal beam after the signal beam passes through the interrogation optical fiber (S3). Then, the light intensity of the signal beam, which has passed through the interrogation optical fiber and undergone different attenuations according to the wavelength, and the light intensity of the reference beam, which has not passed through the interrogation optical fiber, are measured in the detecting unit (S4).

The wavelength of the signal beam can be derived in the analyzing unit by comparing the light intensities of the reference beam and the signal beam measured in the detecting unit, and, finally, the physical amount applied to the sensing unit by the variation in the external environment such as the temperature, the strain, the bending, the torsion, the pressure, the refractive index, the concentration, etc. can be derived from the derived wavelength of the signal beam (S5).

In the above, although the present invention has been explained by referring to preferred embodiments thereof, the embodiments are mere examples and not used to restrict the present invention. Therefore, the person of an ordinary skill in the field the present invention pertains will understand that various unillustrated modifications and applications can be envisaged without departing from the scope of the essential characteristics of the present invention. For example, the components which are specifically included in the embodiments of the present invention can be modified to be practiced. Also, the differences related to these modifications and applications are to be interpreted as being encompassed by the scope of the present invention which is defined in the appended claims.

The invention claimed is:

1. An optical fiber sensor system comprising:
   a light source unit which outputs an input beam of a predetermined wavelength;
   a sensing unit which receives the input beam by using a sensor, whose optical characteristic is varied according to an applied physical amount, and generates a signal beam;
   a measuring unit which derives the physical amount applied to the sensing unit by using the signal beam which is delivered from the sensing unit; and
   a second optical coupler which delivers the input beam, which leaves the light source unit, to the sensing unit, and distributes the signal beam, which is generated in the sensing unit, to the measuring unit,
   wherein the measuring unit includes:
   a first optical coupler which distributes the signal beam into two optical paths;
   an interrogation optical fiber which is arranged on one optical path on which the signal beam travels; and
   a detecting unit which detects a light intensity of the signal beam, which has passed through the interrogation optical fiber, and a light intensity of a reference beam which is delivered to the other optical path by the first optical coupler,
   wherein the interrogation optical fiber linearly absorbs light in a predetermined wavelength range, and the physical amount applied to the sensing unit is derived by comparing the light intensity of the signal beam with the light intensity of the reference beam which are detected by the detecting unit.

2. The optical fiber sensor system according to claim 1, characterized in that a material having a linear light absorption characteristic in the predetermined wavelength range is added to the optical fiber during a manufacturing process of the optical fiber, and that a light absorption intensity and a slope of the light absorption with wavelength are varied by adjusting an amount of the material having the light absorption characteristic or by adjusting a length of the interrogation optical fiber.

3. The optical fiber sensor system according to claim 2, characterized in that the material having a linear light absorption characteristic in the predetermined wavelength range is at least one material selected from the group consisting of a rare earth element, a transition metal element, and nanoparticles.

4. The optical fiber sensor system according to claim 3, characterized in that at least one of the rare earth element, the transition metal element, and the nanoparticles is added to the interrogation optical fiber such that an overall wavelength range or a partial wavelength range having the linear light absorption characteristic can be used.

5. The optical fiber sensor system according to claim 1, characterized in that the measuring unit includes a first detecting unit which detects a signal of the reference beam distributed by the first optical coupler, and a second detecting unit which detects the signal beam distributed by the first optical coupler.

6. The optical fiber sensor system according to claim 5, characterized in that the optical fiber sensor system further comprises an analyzing unit which is connected with the first and second detecting units, and that the analyzing unit compares the light intensity of the reference beam derived from the first detecting unit with the light intensity of the signal beam derived from the second detecting unit, and analyzes a ratio between the light intensities of the reference beam and the signal beam using a first order function to derive a varied physical amount.

7. The optical fiber sensor system according to claim 1, characterized in that an optical isolator is arranged between the light source unit and the second optical coupler to prevent a propagating beam from being reflected in a reverse direction.

8. The optical fiber sensor system according to claim 1, characterized in that more than one sensing unit and more than one measuring unit are arranged, a wavelength dividing element is arranged between the second optical coupler and the first optical coupler, and the signal beams, which are delivered from of the sensing units, are divided according to the wavelength and then delivered to the measuring units.

9. The optical fiber sensor system according to claim 1, characterized in that an optical switch is arranged between the first optical coupler and the detecting unit, and the light intensity of the reference beam and the light intensity of the signal beam which has passed through the interrogation optical fiber are measured by one detecting unit.

10. The optical fiber sensor system according to claim 1, characterized in that more than two types of optical fibers, to which materials having the light absorption characteristic at respective wavelength ranges are added respectively, are connected in series such that at least one of a light absorption distribution, a light absorption intensity, and a light absorption slope of the interrogation optical fiber is varied.

11. An optical fiber sensor system comprising:
a light source unit which outputs an input beam of a predetermined wavelength;
a sensing unit which receives the input beam by using a sensor, whose optical characteristic is varied according to an applied physical amount, and generates a signal beam;
a measuring unit which derives the physical amount applied to the sensing unit by using the signal beam which is delivered from the sensing unit; and
a second optical coupler which delivers the input beam, which leaves the light source unit, to the sensing unit, and distributes the signal beam, which is generated in the sensing unit, to the measuring unit,
wherein the measuring unit includes:
a first optical coupler which distributes the signal beam, which is delivered from the sensor, into two optical paths;
first and second interrogation optical fibers which are arranged on respective optical paths on which the signal beam travels; and
first and second detecting units which detect light intensities of a reference beam and the signal beam which have passed through the first and second interrogation optical fibers,
wherein the first and second interrogation optical fibers are configured with optical fibers which have linear light absorption characteristics in predetermined wavelength range, light absorption slopes of the first and second interrogation optical fibers are opposite to each other, and the light intensities of the reference and the signal beams, which are detected by the detecting unit, are compared with each other to derive the physical amount applied to the sensing unit.

12. The optical fiber sensor system according to claim 11, characterized in that a material having a linear light absorption characteristic in the predetermined wavelength range is added to the optical fiber during a manufacturing process of the optical fiber, and that a light absorption intensity and a slope of the light absorption with wavelength are varied by adjusting an amount of the material having the light absorption characteristic or by adjusting a length of the interrogation optical fiber.

13. The optical fiber sensor system according to claim 12, characterized in that the material having a linear light absorption characteristic in the predetermined wavelength range is at least one material selected from the group consisting of a rare earth element, a transition metal element, and nanoparticles.

14. The optical fiber sensor system according to claim 13, characterized in that at least one of the rare earth element, the transition metal element, and the nanoparticles is added to the interrogation optical fiber such that an overall wavelength range or a partial wavelength range having the linear light absorption characteristic can be used.

15. The optical fiber sensor system according to claim 11, characterized in that the measuring unit is configured with a first detecting unit which detects a signal of the reference beam distributed by the first optical coupler, and a second detecting unit which detects the signal beam distributed by the first optical coupler.

16. The optical fiber sensor system according to claim 15, characterized in that the optical fiber sensor system further comprises an analyzing unit which is connected with the first and second detecting units, and that the analyzing unit compares the light intensity of the reference beam derived from the first detecting unit with the light intensity of the signal beam derived from the second detecting unit, and analyzes a ratio between the light intensities of the reference beam and the signal beam using a first order function to derive a varied physical amount.

17. The optical fiber sensor system according to claim 11, characterized in that an optical isolator is arranged between the light source unit and the second optical coupler to prevent a propagating beam from being reflected in a reverse direction.

18. The optical fiber sensor system according to claim 11, characterized in that more than one sensing unit and more than one measuring unit are arranged, a wavelength dividing element is arranged between the second optical coupler and the first optical coupler, and the signal beam, which is delivered from each of the sensing units, is divided according to the wavelength and delivered to each of the measuring units.

19. The optical fiber sensor system according to claim 11, characterized in that an optical switch is arranged between the first optical coupler and the detecting unit, and the light intensity of the reference beam and the light intensity of the signal beam, which has passed through the interrogation optical fiber are measured by one detecting unit.

20. An optical characteristic measuring device constituting a measuring unit for measuring and analyzing an optical signal generated in a sensor of an optical fiber sensor system, comprising:
- a first optical coupler for distributing a signal beam delivered from the sensor into two optical paths;
- an interrogation optical fiber arranged on one optical path on which the signal beam travels; and a detecting unit for detecting a light intensity of the signal beam, which has passed through the interrogation optical fiber, and a light intensity of a reference beam which is delivered to the other optical path by the first optical coupler, and wherein the interrogation optical fiber has a linear light absorption characteristic in a predetermined wavelength range, and the physical amount applied to the sensing unit is derived by comparing the light intensity of the signal beam with the light intensity of the reference beam which are detected by the detecting unit.

* * * * *